United States Patent [19]

Hemstreet

[11] 3,713,100

[45] Jan. 23, 1973

[54] METHOD AND APPARATUS FOR IDENTIFYING LETTERS, CHARACTERS, SYMBOLS, AND THE LIKE

[75] Inventor: Harold S. Hemstreet, Binghamton, N.Y.

[73] Assignee: Character Recognition Corporation

[22] Filed: Feb. 10, 1953

[21] Appl. No.: 336,080

[52] U.S. Cl...340/146.3 Y, 340/149 R, 340/146.3 C, 340/146.3 D, 340/146.3 S, 340/146.3 T

[51] Int. Cl. ............................................G06r 9/00

[58] Field of Search..340/149, 164, 318, 169, 149 A, 340/146.3, 166, 174.1; 178/15, 6.7, 31, 30; 179/219, 100.3; 209/101

[56] References Cited

UNITED STATES PATENTS

| | | | |
|---|---|---|---|
| 1,815,996 | 7/1931 | Weaver | 178/4 |
| 1,915,993 | 6/1933 | Handel | 235/61.11 |
| 2,026,329 | 12/1935 | Tauschek | 235/61.6 |
| 2,131,911 | 10/1938 | Ayres | 250/220 |
| 2,210,706 | 8/1940 | Carlisle | 178/13 |
| 2,228,782 | 1/1941 | Sharples | 179/100.3 |
| 2,261,542 | 11/1941 | Dickinson | 235/61.11 |
| 2,362,004 | 11/1944 | Heidinger | 235/61.6 |
| 2,399,720 | 5/1946 | Brand et al. | 178/33 |
| 2,458,030 | 1/1949 | Rea | 340/175 |
| 2,464,353 | 3/1949 | Smith et al. | 328/154 |
| 2,493,543 | 1/1950 | Merchant | 340/228 |
| 2,513,525 | 6/1950 | Shenk | 328/140 |
| 2,517,102 | 8/1950 | Flory | 179/1 |
| 2,518,694 | 8/1950 | Jannopoulo | 179/1 |
| 2,533,242 | 12/1950 | Gridley | 340/318 |
| 2,601,393 | 6/1952 | Hammond | 340/164 |
| 2,615,992 | 10/1952 | Flory et al | 35/35 |
| 2,616,983 | 11/1952 | Zworykin et al. | 179/100.3 |
| 2,626,989 | 1/1953 | Brown | 178/6.7 |
| 2,628,346 | 2/1953 | Burkhart | 340/174.1 |
| 2,648,723 | 8/1953 | Goldsmith | 178/6.8 |
| 2,652,491 | 9/1953 | Maher et al. | 328/109 |
| 2,653,186 | 9/1953 | Hurford | 178/7.1 |
| 2,659,823 | 11/1953 | Vossberg | 356/160 |
| 2,663,758 | 12/1953 | Shepard | 178/17 |
| 2,679,636 | 5/1954 | Hillyer | 340/149 |
| 2,682,043 | 6/1954 | Fitch | 340/147 |
| 2,712,898 | 7/1955 | Knutsen | 235/61.7 |
| 2,731,621 | 1/1956 | Sontheimer | 209/111.7 |
| 2,738,499 | 3/1956 | Sprick | 340/347 |
| 2,741,312 | 4/1956 | Johnson | 234/56 |
| 2,838,602 | 6/1958 | Sprick | 178/15 |
| 3,469,263 | 9/1969 | King | 340/146.3 |

OTHER PUBLICATIONS

"Research on Reading Aids for the Blind," Journal of the Franklin Institute, Vol. 247, No. 5, May 1949, pages 483–496.

*Primary Examiner*—Thomas A. Robinson
*Attorney*—Richard G. Stephens

EXEMPLARY CLAIM

17. In a character recognition machine, means to compare a single character of a limited group of characters being recognized with all of a plurality of memory elements, each of said memory elements defining one of all of the possible characters of the group to be recognized, means for producing a group of separate signals as a result of the individual comparisons, the magnitude of each of said signals being an indication of the degree of match in each comparison, and means responsive to said signals of the group to identify a unique circuit associated with the optimum signal indicating the closest match and indicative of said single character.

65 Claims, 20 Drawing Figures

United States Patent [19]
Hemstreet
[11] 3,713,100
[45] Jan. 23, 1973
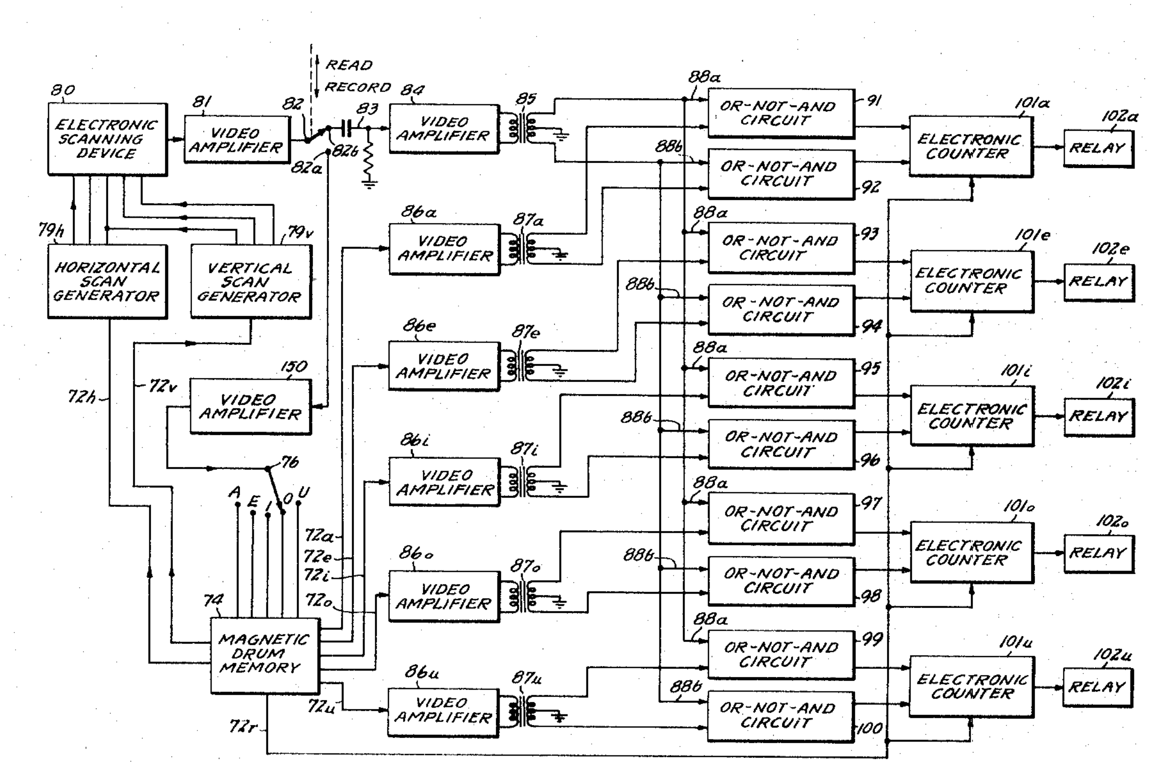

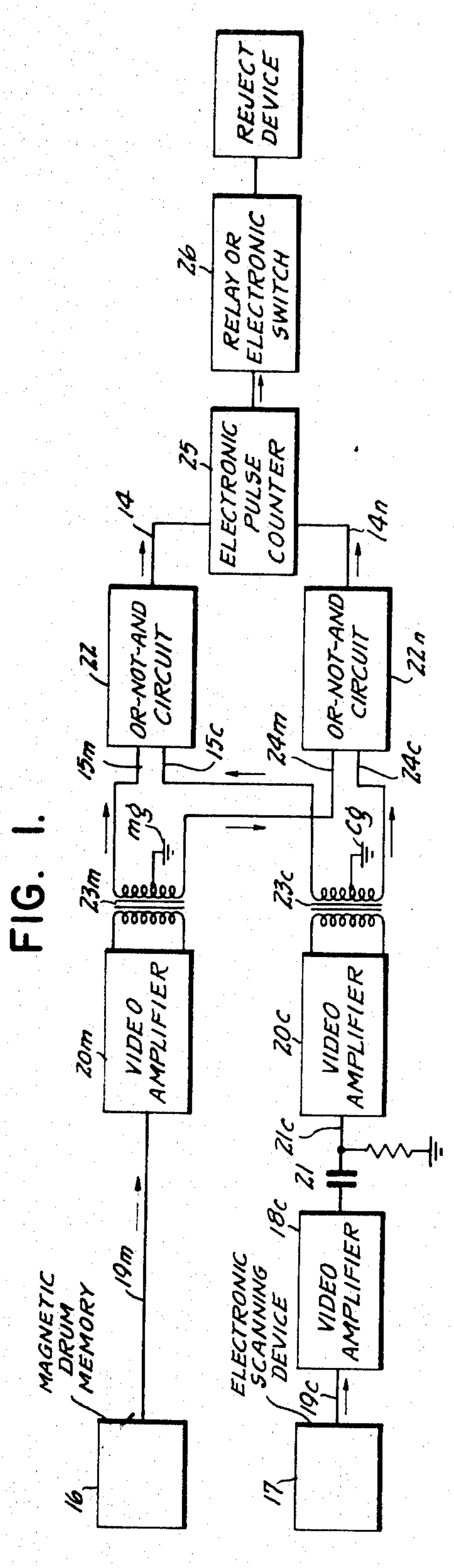
FIG. 4.
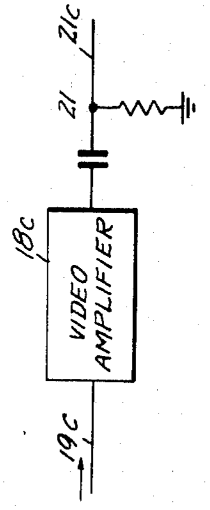
FIG. 2a.
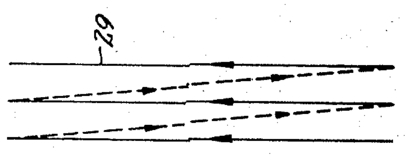
FIG. 2
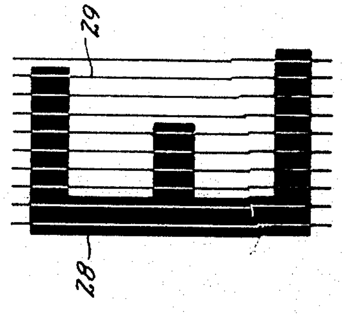
INVENTOR
HAROLD S. HEMSTREET
BY
Robert Irving Williams
ATTORNEY FIG. 2b.
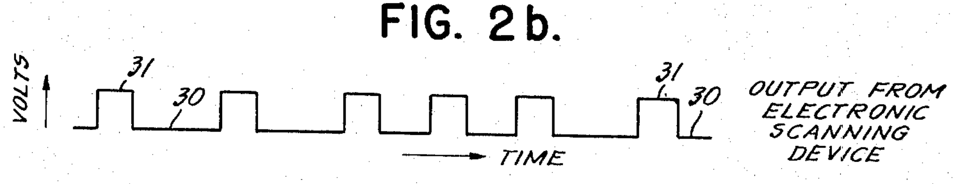
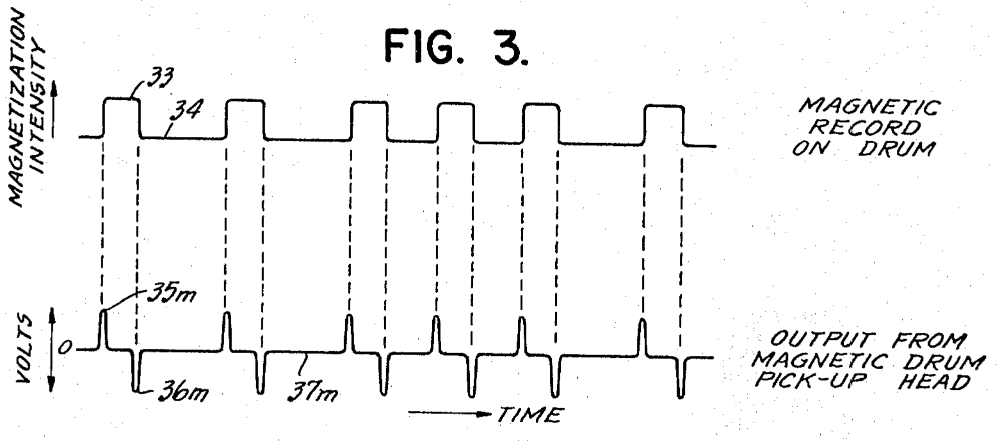
FIG. 5.
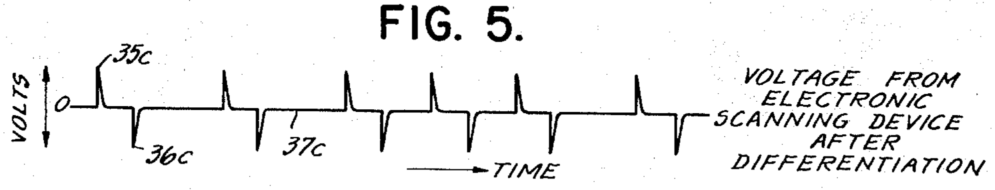
FIG. 7
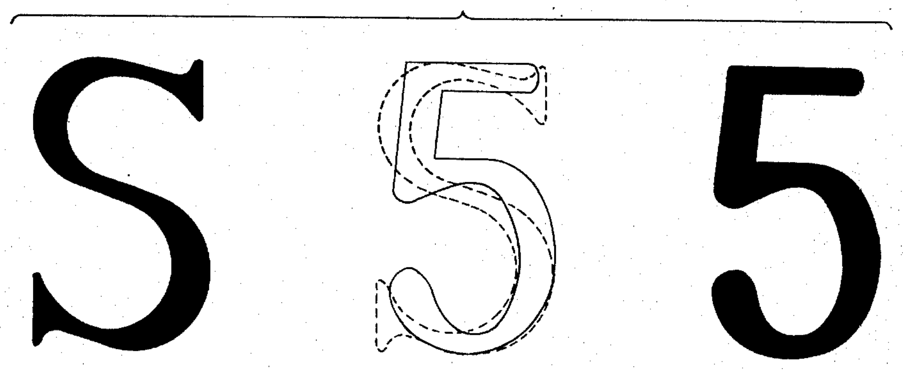
INVENTOR
HAROLD S. HEMSTREET
BY
Robert Irving Williams
ATTORNEY

PATENTED JAN 23 1973

3,713,100

INVENTOR
HAROLD S. HEMSTREET
BY
Robert Irving Williams
ATTORNEY

INVENTOR
HAROLD S. HEMSTREET
BY
Robert Irving Williams
ATTORNEY

INVENTOR
HAROLD S. HEMSTREET
BY
Robert Irving Williams
ATTORNEY

INVENTOR
HAROLD S. HEMSTREET
BY
Robert Irving Williams
ATTORNEY

INVENTOR
HAROLD S. HEMSTREET
BY
Robert Irving Williams
ATTORNEY

INVENTOR
HAROLD S. HEMSTREET
BY
Robert Irving Williams
ATTORNEY

FIG. 14b.
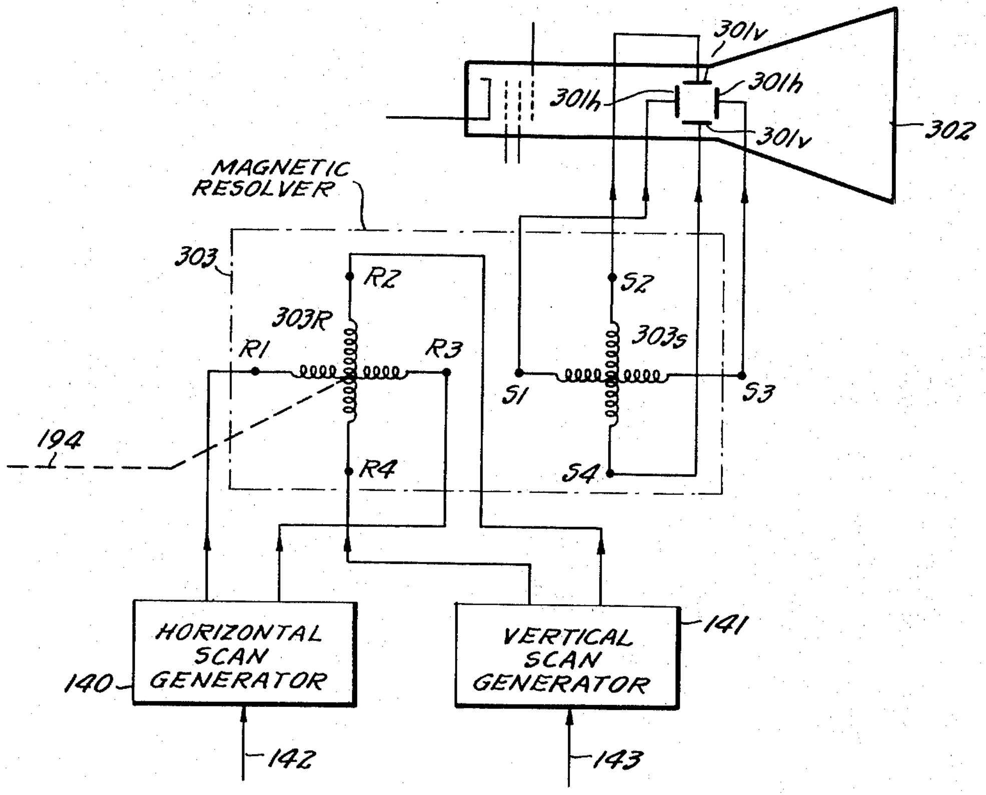
FIG. 15.
FIG. 14a.
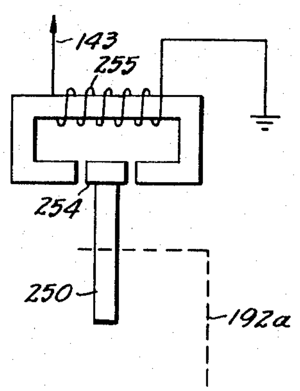
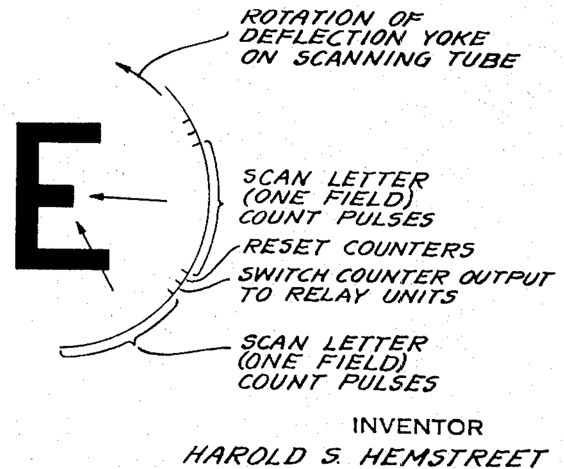
INVENTOR
HAROLD S. HEMSTREET
BY
Robert Irving Williams
ATTORNEY

METHOD AND APPARATUS FOR IDENTIFYING LETTERS, CHARACTERS, SYMBOLS, AND THE LIKE

This invention relates to identification methods and apparatus and particularly to electro-mechanical methods and means for the identification of graphic data. In certain of its aspects, moreover, it relates to devices for counting electrical pulses and for determining lack of coincidence in electrical impulses. In its more specific aspects, it relates to devices of the general character of those known as "reading" devices and to elements thereof.

There is a wide need for devices which can efficiently and effectively identify letters, numerals, marks, symbols, fingerprints, and a wide number of other graphic data, which can set up specific reactions to individual ones thereof, which can recognize the similarity or similar graphic data, and/or which can otherwise utilize its "reading" ability. Methods and machines of such nature are utilizable in such widely different fields as feeders for computing machines and as means to check the similarity of a thumb-print just made with a thumb print on file to prevent unauthorized access to an industrial plant or a military installation.

With the foregoing and other considerations in view, I have provided methods and apparatus whereby graphic data may be identified, and/or comparisons made, rapidly and accurately. Pursuant to my invention, graphic data may be readily identified whether typewritten, printed, engraved, photographically produced, or otherwise formed; whether mechanically, manually, photographically or otherwise produced; and whether or not visible to the naked eye; just so long as this data is discernable under the type of electro-magnetic radiation known by the term "light" in its most general sense. As will become more apparent as the description proceeds, the invention is applicable to the identification of any symbol or item of indicia contained on a background surface where such indicia has a contrasting energy-reflective property or other contrasting physical property which allows a scanning system to discern whether indicia area or background area is being scanned at any instant. Television camera tubes and other photo-tubes are usable for this purpose, as well as devices popularly called "electric eyes."

In one form herein illustrated, the invention comprises broadly the following steps:

A. Producing an electrical quantity comprising a series of spaced impulses, in a timed sequence, characteristic of an item to be examined.

B. Comparing that quantity with a norm or pattern, previously or simultaneously determined.

C. Rejecting the item if the quantity differs from the norm to a degree exceeding an arbitrary desired tolerance previously adopted.

In the preferred form of the invention an electrical signal derived from an examination or scanning of an area containing an unknown symbol may be compared with stored electrical quantities each of which are representative of a different known or reference symbol, and such stored electrical quantities may be maintained upon a memory device such as a magnetic drum, for example. Thus an electrical quantity such as a train of pulses derived from scanning an unknown symbol may be compared on the basis of time-coincidence, for example, with various trains of pulses derived from the memory device. Those pulses of each train which are coincident in time with pulses of the other train may be ignored, and those pulses of one or both trains which are not coincident in time with pulses of the other train may be counted, and the number of pulses counted will be a function of the differences between the unknown symbol being examined and the reference symbol with which it is being compared. If the process is preformed by comparing the unknown symbol pulse train with a number of different pulse trains representing different known symbols, it will be seen that the unknown symbol may be identified by a process of elimination, or rejection of all known symbols which differ.

Where the quantities from one item are recorded on a drum, the take-off is commonly in the form of a quantity which is a time derivative of the original quantity. If such a differentiated quantity is to be compared with the original quantity from the other item, the other quantity also should be differentiated. This may be done by the familiar R-C circuit, or by other circuits well known to the art.

Pursuant to the invention, a scanning device may be employed to effectuate an electrical flow, responsive piece-by-piece, to different small fragments or bits of a graphic datum being scanned. Any of the various scanning devices used in television broadcasting are adaptable for use in accordance with the invention. The photo-electrical results of such scanning may be used to form a record for future comparison, or may be compared with a record previously made, or may be utilized in other desirable ways for identification.

For comparison procedures, I have, moreover, provided an anti-coincidence device which may be called an "or-not-and" device, which will note or indicate lacks of time-coincidence between a plurality of pulse trains but which will make no note and give no indication when the pulses of such plurality are substantially coincident in time. The invention further contemplates the provision of various procedures, apparatus, mechanisms, electrical arrangements, and the like, whereby the identification of graphic data may be carried out or facilitated.

The invention accordingly comprises the several steps and the relation and order of one or more of such steps with respect to each of the others, and the apparatus embodying features of construction, combination of elements and arrangements of parts which are adapted to effect such steps, all as exemplified in the following disclosure, and the scope of the application of which will be indicated in the claims.

For a fuller understanding of the nature and objects of the invention, reference should be had to the following detailed description taken in connection with the accompanying drawings, in which FIG. 1 is a diagrammatic view illustrating a procedural sequence which may be followed, and a type of arrangement of devices which may be used in carrying out the invention;

FIGS. 2, 2*a*, and 2*b* are somewhat diagrammatic showings of an operation of the scanning means;

FIG. 3 is a diagram showing the comparison between the scan data as recorded on the memory drum and the output from the pickup heads, in response thereto;

FIG. 4 shows a circuit for differentiating the camera quantity;

FIG. 5 is a graphic view of the output of the scanning operation, when differentiated to make it comparable with the output of the memory device;

Figure 6:
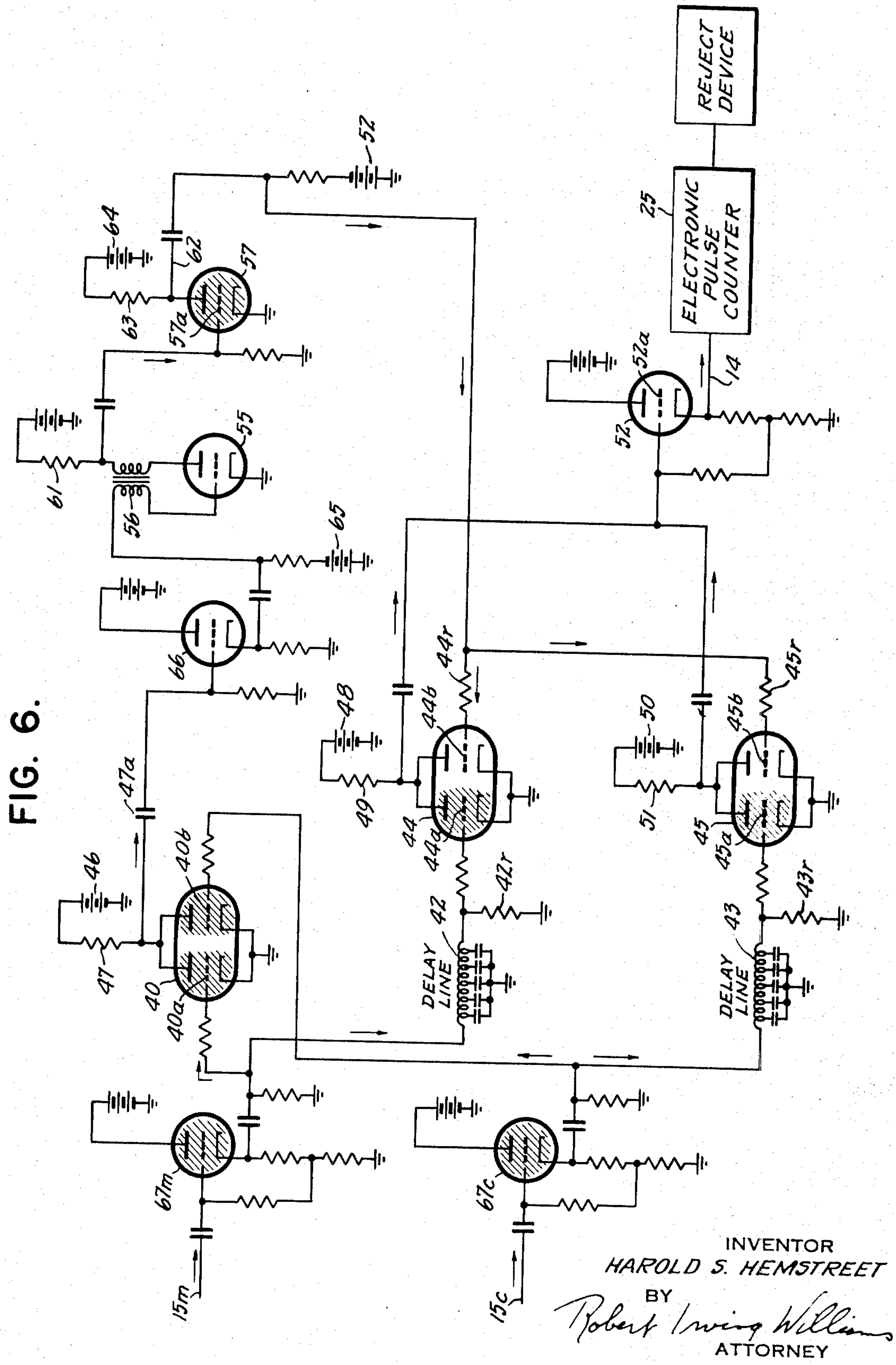
Figure 8:
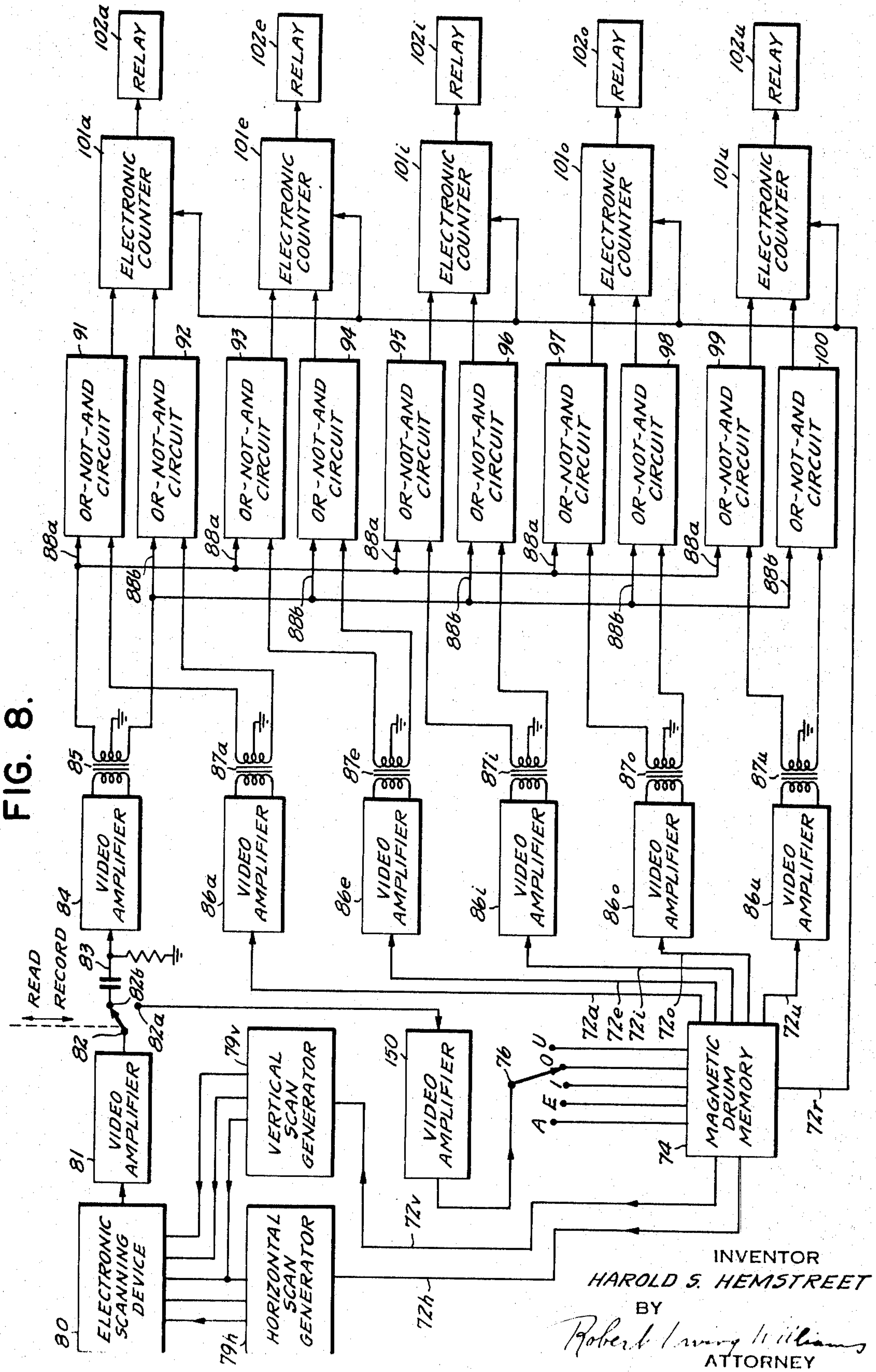
Figures 9, 10, 10A:
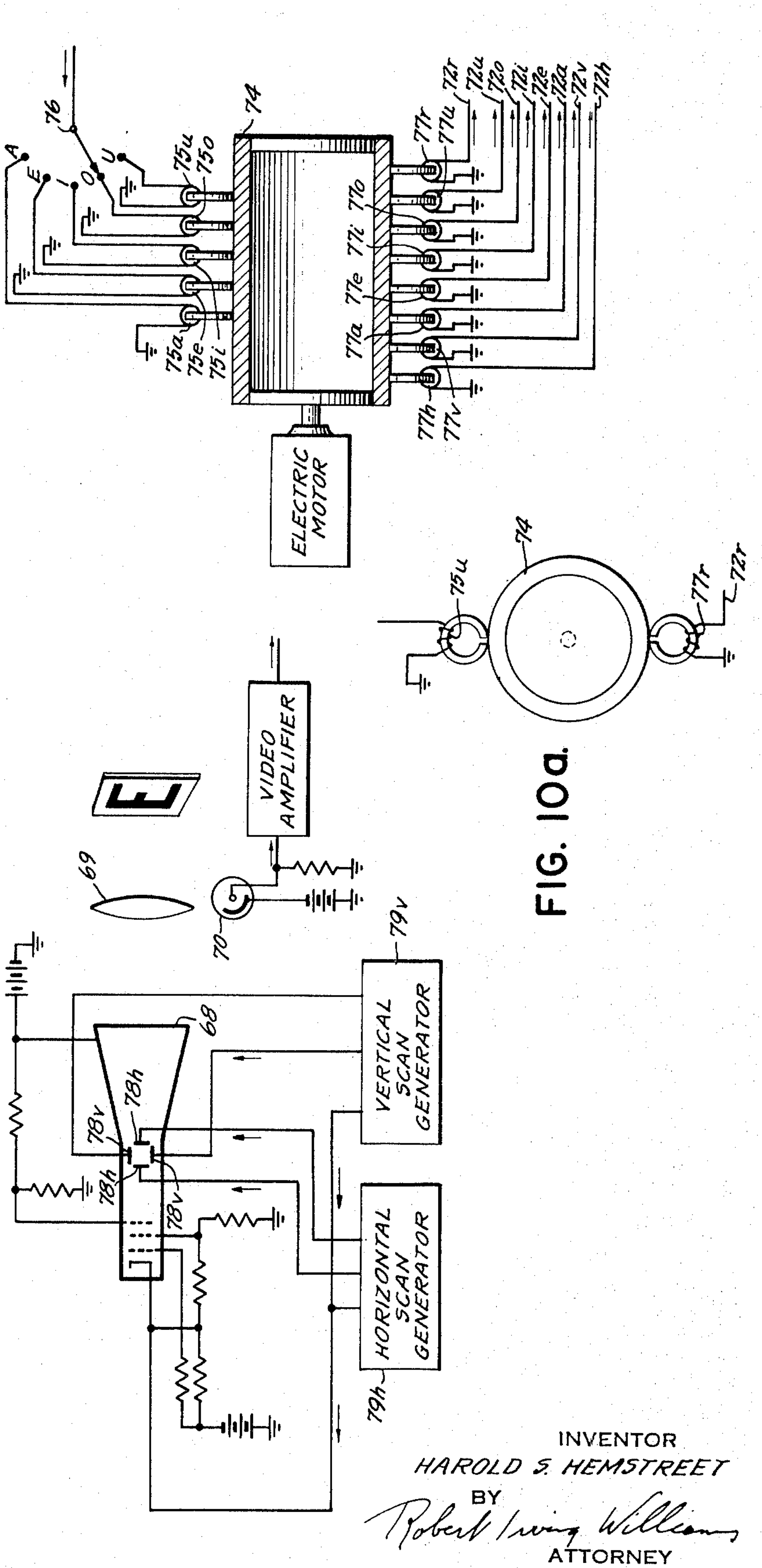
Figure 11:
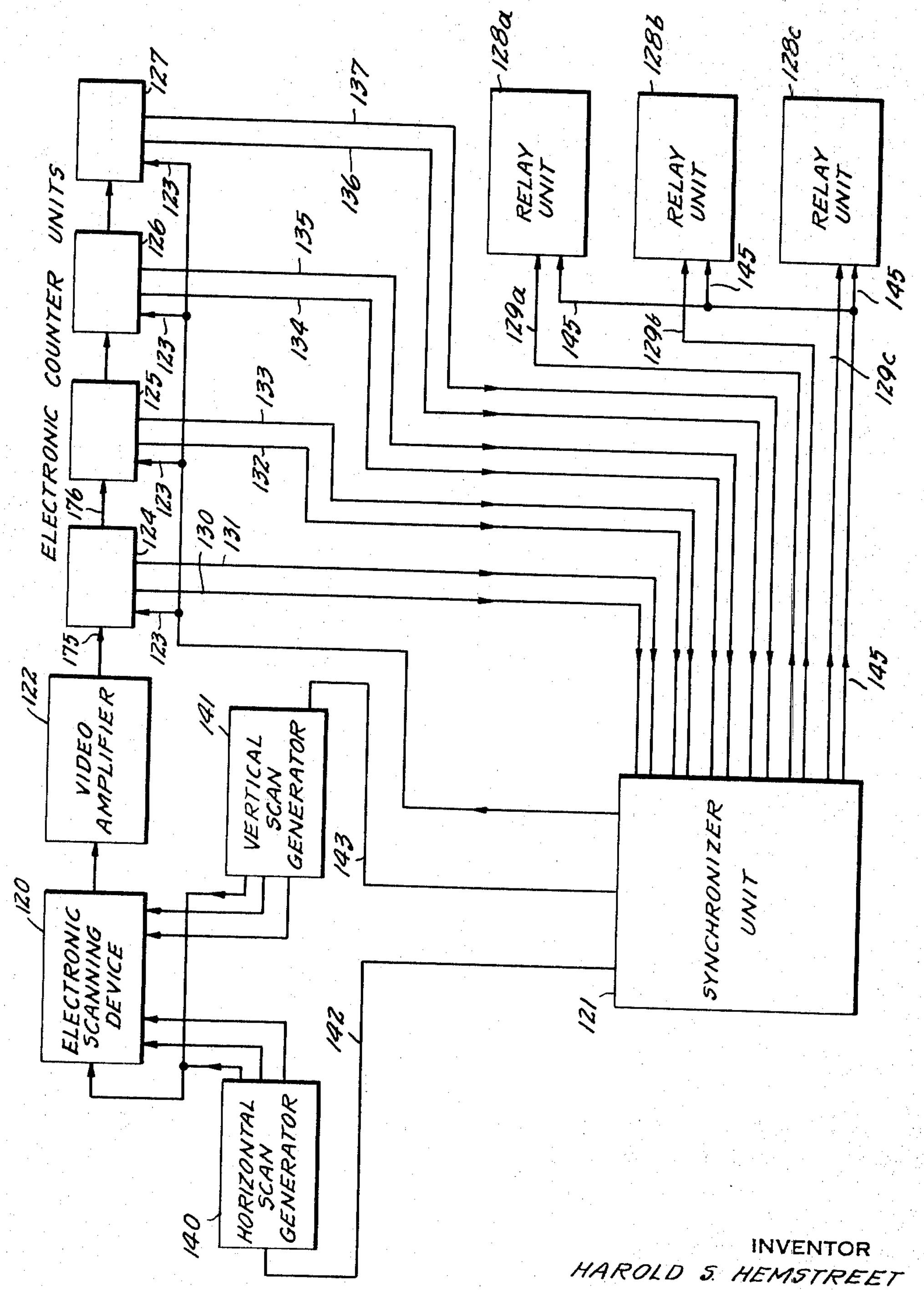
Figure 12:
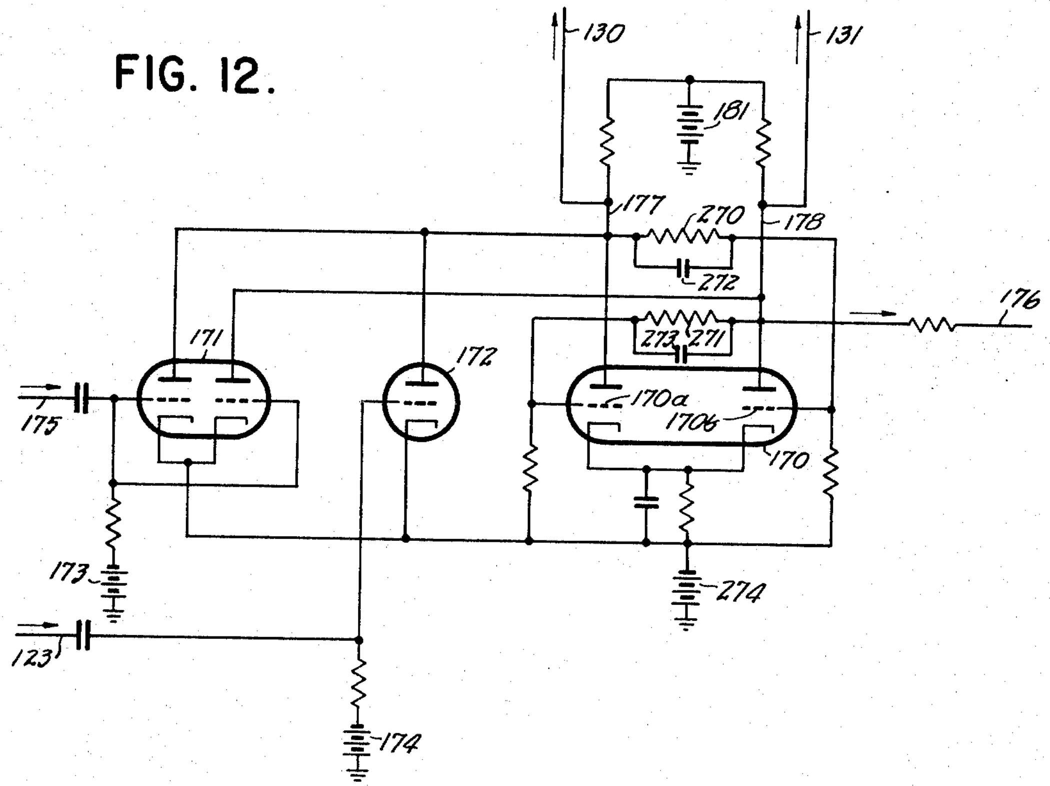
Figure 13:
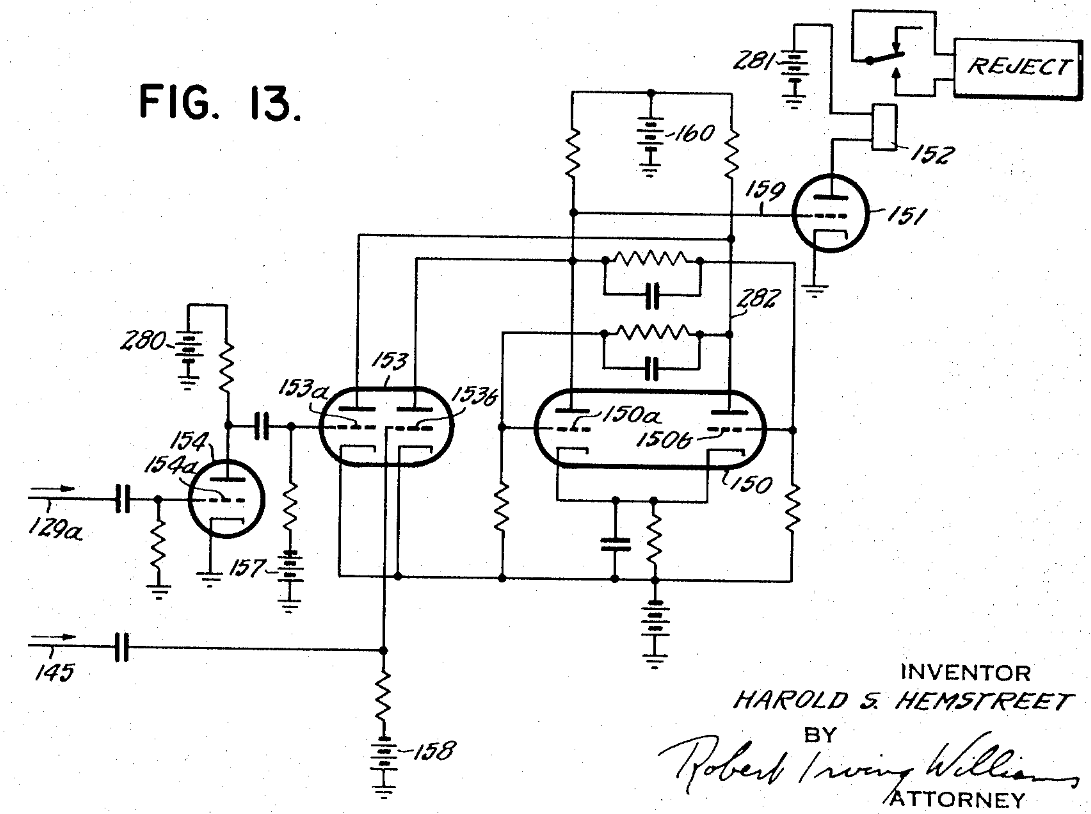

FIG. 6 in a diagram of an "or-not-and" circuit, for comparing the separate quantities;

FIG. 7 is a comparison of similar but not identical figures;

FIG. 8 shows a system for comparing a sample with five separate pattern records in a memory device;

FIG. 9 shows a scanning device which may be used;

FIG. 10 is a diagram of a memory device as applied to this embodiment of the invention;

FIG. 10*a* is a right-hand end view of FIG. 10;

FIG. 11 is an embodiment which does not require a memory device;

FIG. 12 is a diagram showing the construction of one of the identical electronic counter units of FIG. 11;

FIG. 13 is a diagram showing the construction of one of the identical relay units of FIG. 11.

Figure 14:
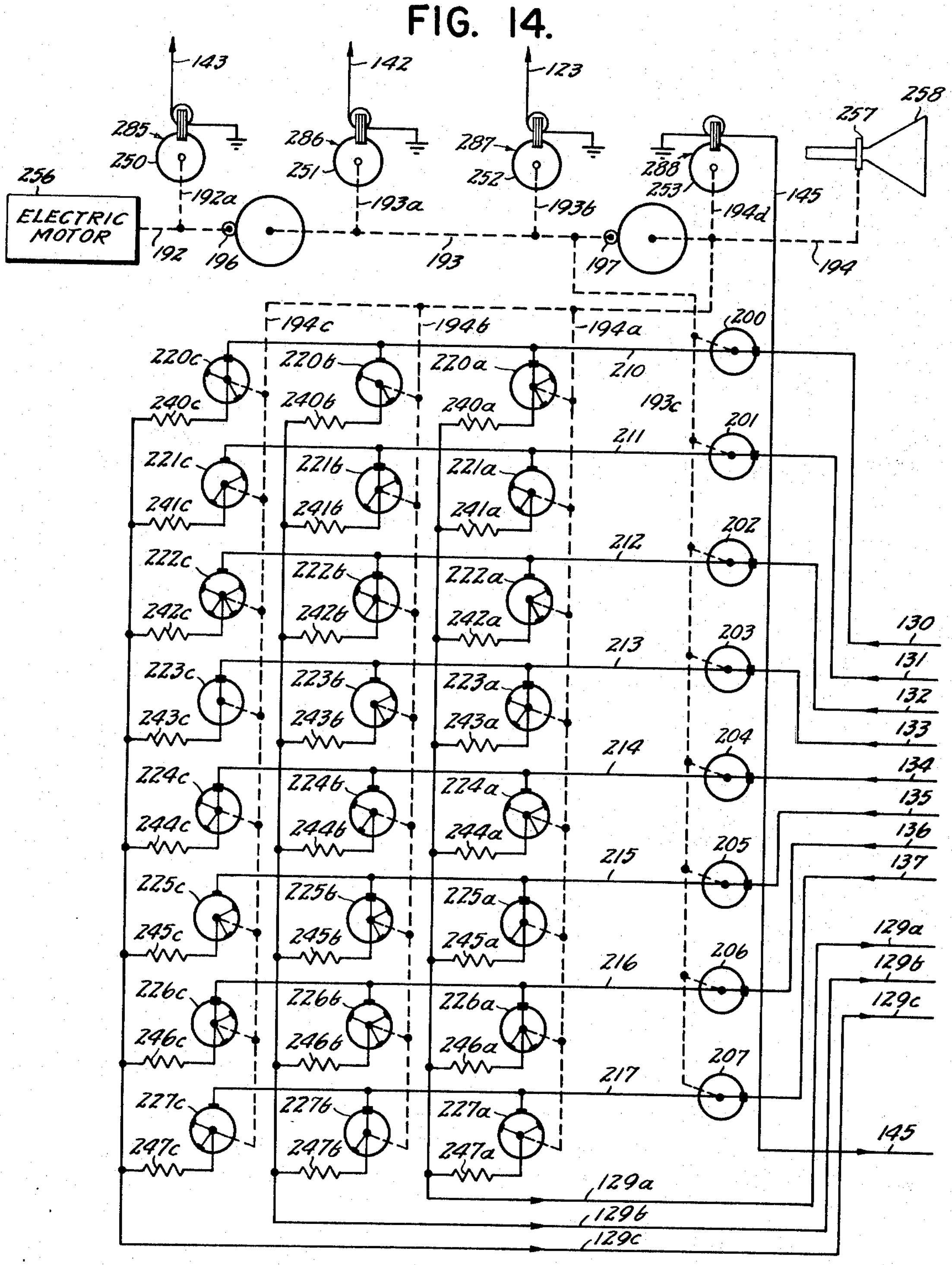
Figure 8:
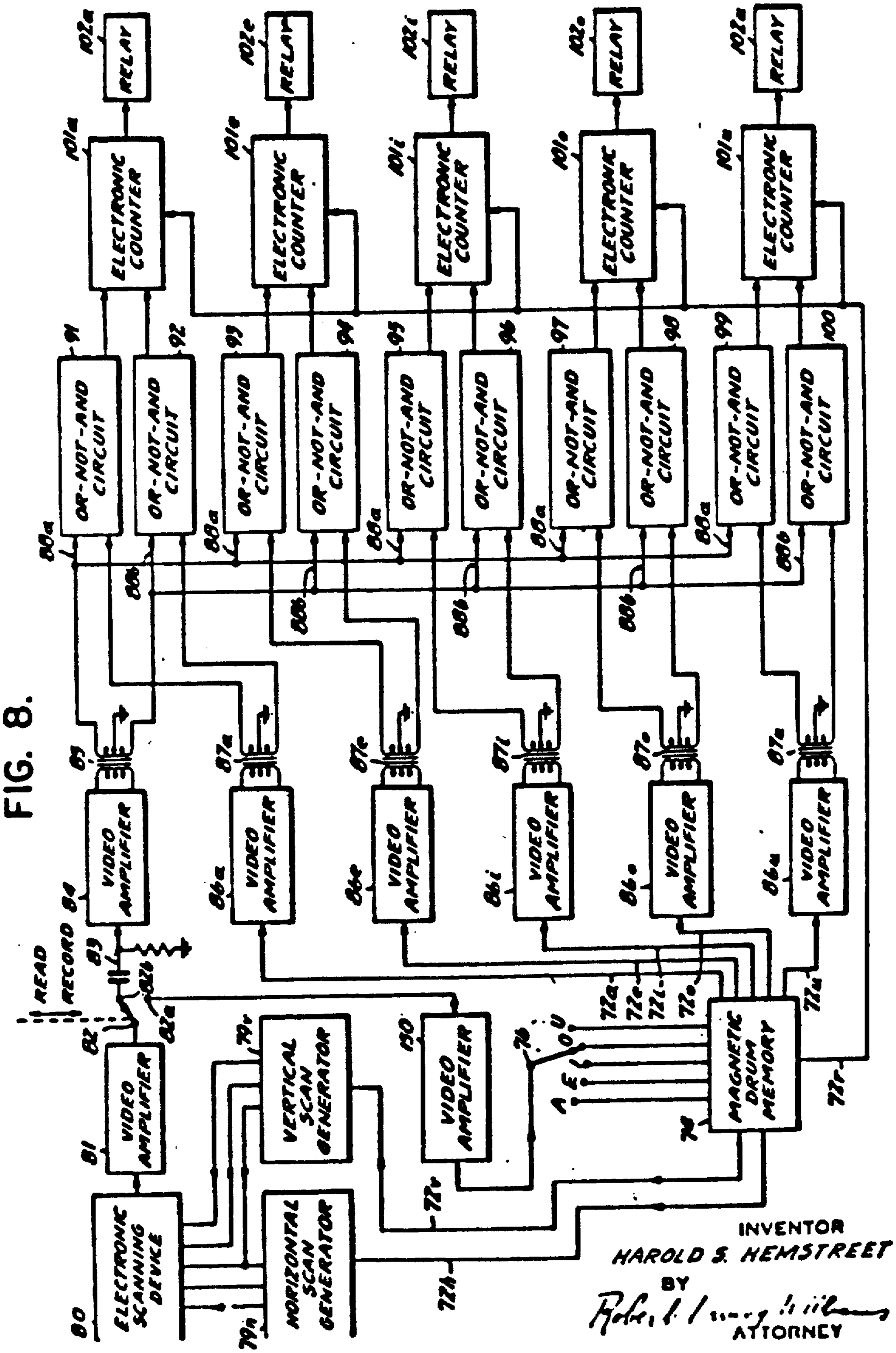

FIG. 14 is a schematic diagram of the synchronizer unit of FIG. 11;

FIG. 14*a* is a detail view of a wheel and magnet shown in FIG. 14;

FIG. 14*b* shows an arrangement usable with the arrangement shown in FIG. 14; and FIG. 15 shows the time sequence of events as the scanning yoke is rotated in the system employing multiple scanning.

The invention in its preferred form is exemplified in the construction diagrammatically shown in FIG. 1. It contemplates, first, scanning the datum or pattern in such a manner as to produce an electrical pulse train herein referred to as an electrical quantity which is characteristic of the pattern: and in addition producing a comparable quantity characteristic of the sample to be compared, and then making comparison of the sample with the pattern by comparing the electrical quantities thus provided.

The scanning herein proposed has the same general purpose as does the scanning done with a television camera for the purpose of transmitting a picture. In either case the purpose of the scanning is to break down a two dimensional picture, in a determined order or sequence, so that the many small bits of information which comprise the picture form an electrical quantity that varies with time. The electrical quantity thus produced is unique for any picture or datum scanned in the particular sequence, this uniqueness being demonstrated in television by the ability of a television receiver to reconstruct the picture or datum from the time varying electrical quantity. In the preferred form of this invention the uniqueness of a time varying electrical quantity is utilized to identify the picture or datum by its comparison with many pattern or memory-derived quantities representing possibilities of data with which the unknown datum may correspond, and by "rejection" of those data which do not correspond the identity of the unknown datum may be determined. It will be seen that the scanning may be done with a camera tube or scanner of any suitable type, as for example, the types suitable for or commonly employed in television broadcasting. In order that a series of comparisons may be made, it is desirable, in the preferred form of the invention, that one of the quantities be recorded on some form of memory device so that comparisons may be made with a series of different patterns, or with a series of different samples. The scanner may perform the operation in any desired manner regardless of the direction, continuity or lack of continuity of the lines traversed by the scanning beam, provided that the same system be used for the sample as for the pattern. One practical use of this device consists in the comparison of a sample with one or many patterns already recorded in the memory device, or to compare many samples with a fixed pattern.

The invention will be first illustrated in the preferred form in which one quantity is stored on a magnetic drum memory, or any other form of memory device. In some embodiments of the invention where the sample and pattern are both available, the electrical quantities may be compared directly without a memory device. In certain other embodiments the pattern may be examined to determine certain fixed quantitative values, and thereafter the sample may be examined to compare its comparable values with these fixed values. For some purposes, the characteristics of the pattern may be reduced to numerical form so that the examination of the sample may then use these fixed numerical quantities as the standard.

We may first refer to the system as a whole as shown in FIG. 1. As will be later described, the pattern has been scanned to produce a magnetic record on a magnetic drum 16 which, when revolved, gives a quantity at **19*m* characteristic of the pattern. The sample is scanned synchronously with the drum movement to produce a quantity at 19*c* characteristic of the sample. The quantity at 19*m* is amplified at 20*m* and fed to the pulse transformer 23*m*** which is grounded at a center tap *mg* on the secondary winding. One output of pulse transformer **23*m* appears on 15*m* and goes to special selector circuit 22**.

The quantity **19*c* is amplified at 18*c* before being sent to the differentiating circuit 21, since the quantity at 19*c* is at a relatively low power level, and further, since there is considerable attenuation in the differentiating circuit 21. The quantity 21*c*, having been differentiated and somewhat amplified, is comparable to the quantity 19*m* from the magnetic drum memory. The quantity 21*c* is amplified at 20*c* and fed to a pulse transformer 23*c* which, like 23*m***, is grounded at a center tap *cg* on the secondary winding and feeds a quantity **15*c* to an anti-coincidence or "or-not-and" circuit 22**.

This circuit 22 is specially designed to deliver an electric pulse to an electronic pulse counter 25 whenever a pulse of predetermined polarity is received at either **15*m* or 15*c* without a time-coincident pulse of like polarity arriving from the other, but not to send any signal to 25 if pulses arrive simultaneously at both 15*m* and 15*c*. It is for this reason I have designated these circuits 22** as "or-not-and" circuits.

Two of the "or-not-and" circuits 22 and **22*n* are used because each one is responsive to pulses of only one polarity as will be shown later. By providing one such circuit a comparison can be made between the pulses of the two quantities which are of one polarity, but providing the second circuit 22*n*, connected to the lower ends 24*m* and 24*c* of the pulse transformers 23*m* and 23*c* respectively, comparison can be made between the pulses of both polarities in the quantities 19*m* and 21*c***.

The two circuits 22 and **22*n* are both connected to the pulse counter 25. Relay 26 is operated by the counter 25 to reject the sample as different from the pattern if the counter records more pulses than a predetermined desired tolerance; that is, if there are more points of difference between the sample and the pattern than are deemed permissible. Theoretically a single pulse at 25** will show a difference between the sample and the pattern, but generally different samples of the same character will show minor variations, and for this reason a permissible tolerance will be adopted.

FIGS. 2, 2a, and 2b illustrate diagrammatically the operation of a suitable simple scanning system. In accordance with this scheme, the scanning beam traverses preferably in sequence the pattern 28, in this case the Gothic letter E, in ten parallel scan lines 29 from bottom to top. So long as the beam rests upon the white paper, a static condition exists causing the output to form an electrical quantity of constant voltage as at 30 in FIG. **2*b*. This we may call the base or zero voltage. When, however, the beam passes from the white to the black, a voltage is produced which remains constant until the beam moves back from black to white thus appearing as a pulse 31. With this arrangement, bi-valued electrical quantity is produced which comprises a time series of substantially square pulses 31** in a spaced relation dependent on the contour of the pattern symbol e. The degree to which this quantity is characteristic of the pattern depends upon the proximity of the scan lines to each other, and therefore upon the number of scan lines utilized.

If now a similar scanning is performed on a sample to be tested, and if these two quantities are identical within the capacity of the device, it will show that the pattern and the sample are also identical. This comparison can be made, for example, by reversing the polarity of one quantity and superimposing it upon the other quantity. Every point where the pulses are of like polarity and simultaneous, the pulses will cancel out; but every point where there is a difference between the quantities, they will not cancel out and an uncancelled impulse will show a difference to exist between the pattern and the sample.

A more common use of the invention comprises the comparison of a character with a sample or pattern which is already recorded on a memory device, such as a magnetic recorder, or drum. When an electrical quantity, such as shown in FIG. 2b is imposed upon a magnetic drum memory, such as is shown, for example, in FIG. 10, the magnetization intensity of the drum varies with drum displacement substantially identically to the bivalued scanning derived electrical quantity itself as in FIG. 3, at 33–34. The identity will be clear, altho the sharp corners of the original pulse 31 of FIG. **2*b* are worn off. When, however, an electrical take-off or readout is made from such a magnetic memory, the quantity produced by the take-off is, as is well known, the differential or time derivative of the recorded magnetization intensity, thus giving a plus pulse 35*m* where the original record pulse begins and a minus pulse 36*m* where the original record pulse 33 ends. These are above and below a base 37*m*. When such a quantity is to be compared, therefore, with a primary quantity scanned direct from a pattern or sample as that shown in FIG. 2*b*, it is necessary that the primary quantity be differentiated also. This can be done by the familiar resistance-capacity circuit designated in FIG. 1 as 21. This is illustrated in FIG. 4 which shows at 19*c* the quantity from the camera which, after being amplified at 18*c*, is connected to one side of a condenser C, the other side of which 21*c* carries the differentiated current being connected to the ground by the resistance R. The output at 21*c* of the circuit of FIG. 4 is a quantity of sharp spikes such as shown in FIG. 5 having plus pulses 35*c* and minus pulses 36*c* from a base 37*c*** corresponding to the rise and fall or rate of change of the original undifferentiated pulses.

If the pulses **35*m* and 36*m* of the quantity shown in FIG. 3 are coincident in time with the pulses 35*c* and 36*c* of FIG. 5, and if they are superposed with one in reverse polarity, they will completely cancel each other, but if one pulse 35*m* or one pulse 36*m* is not identical in time with the corresponding pulse 35*c* or 36*c***, the two will not cancel, and a signal will be produced which may be used to point out the lack of identity of the original sample and the original pattern.

The anti-coincidence or "or-not-and" circuit which I used for comparing the quantities from the sample with those from the memory device, and which has heretofore been referred to generally as 22 or **22*n*, is the construction shown in FIG. 6. In FIG. 6 the quantity 15*m* derived from the memory device is coupled thru a capacitor to the grid of a cathode follower 67*m*, and the differentiated quantity 15*c* derived from the pattern is fed thru a capacitor to the grid of cathode follower 67*c*. These two cathode followers 67*m* and 67*c* serve to isolate the "or-not-and" circuit from the pulse transformers 23*m* and 23*c* and prevent loading of the pulse transformers. The output of the cathode follower 67*m* is fed to one grid 40*a* of a double triode 40, and the output of the cathode follower 67*c* is fed to the other grid 40*b* of the same tube. Each of these two quantities is also carried thru a delaying circuit 42 or 43 to one grid 44*a* or 45*a* of a double triode 44 or 45** as will be later described.

In accordance with common practice, the tubes which are conducting in the absence of any pulses are shaded. The plates of the tube 40 are connected to a common plate resistor 47 and also thru a condenser **47*a* to the grid of a cathode follower 66 which controls, or "triggers," a blocking oscillator 55. The voltage developed across resistor 61 is connected thru a condenser to the grid 57*a*. Resistor 61 in the plate circuit of oscillator tube 55 provides a negative signal at grid 57*a*, cutting off the current in tube 57 whenever the blocking oscillator is triggered and current flows in tube 55**.

The plates of the tube 40 are connected in parallel or multiple and are fed from a battery 46 thru a resistance 47. The plates of the tubes 44 and 45 are, for each tube, connected in multiple, being fed respectively from the batteries 48 and 50 thru resistances 49 and 51. The grids **40*a*, 40*b*, 44*a* and 45*a* are normally maintained at a point to make these tubes conducting in the absence of any pulses at 15 *m* or 15*c*, but the other grids 44*b* and 45*b* are biased beyond cut-off by a battery 52 thru resistances 44*r* and 45*r*. A minus pulse at either 15*m* or 15*c* will give a minus pulse at either 44*a* or 45*a*, which will cause a plus pulse at the corresponding plate resistance 49 or 51, which will be fed to the grid 52*a* of a cathode follower tube 52, which in turn feeds a plus pulse out at 14 to an electronic pulse counter 25. A plus pulse at 15***m* or 15*c*, however, will result in plus pulses at grids 40*a*, 40*b*, 44*a* and 45*a* and will have no effect, since the tubes controlled by these four grids are normally conducting at or near saturation. Thus, a minus pulse alone at either 15*m* or 15*c* will operate the counter, and the "or" function of the anti-coincidence circuit is achieved.

The tubes 40, 66, 55, and 57 together with their associated circuits perform the "not-and" function in the device. The two halves of the tube 40 form a standard coincidence, or "gate," circuit. A minus pulse at either grid of tube 40 which coincides in time with, or even slightly overlaps a minus pulse at the the other grid of tube 40 will cutoff both halves of the tube 40 and cause a plus pulse at the common resistor 47, which pulse will go to the grid of cathode follower trigger tube 66, causing that tube to conduct and trigger or "fire" the blocking oscillator tube 55. When the blocking oscillator fires, the tube 55 draws a large surge of current thru resistance 61, sending a negative pulse to grid 57*a*, which cuts off current in tube 57 and causes a plus pulse at the plate lead 62, which plus pulse is imposed on grids 44*b* and 45*b* of tubes 44 and 45. When the plus pulse at the grids 44*b* and 45*b* causes their respective tubes to be fully conducting, negative pulses at either 44*a* or 45*a* cannot cause pulses to be sent to the counter. Thus it will be seen that coincident pulses at 15*m* and 15*c* cause an inhibiting or blocking output from tube 57 which prevents either or both of the pulses from being counted by pulse counter 25. This blocking can occur, however, only if minus pulses come to both grids of tube 40 at the same time, since the signals at 44*b* and 45*b* which prevent pulses from going to the counter depend upon the current being interrupted in both halves of tube 40 at the same time. Unless the cancelling pulse reaches grids 44*b* and 45*b* at least as soon as the signal pulses reach grids 44*a* and 45*a* cancellation would not occur; and the cancelling pulse cannot come unless both of the input pulses have reached tube 40. If one of these pulses was slightly delayed until after the other pulse had registered, a false count would result. The purpose of the blocking oscillator 55 and the delay lines 42 and 43 is to avoid this difficulty. The blocking oscillator produces a pulse which has a longer duration than the input pulse. This is achieved by suitable proportioning of the components of the blocking oscillator, according to standard principles. The delay lines, on the other hand, cause a sufficient delay in the pulse to tubes 44 and 45 so that the signal pulse at 44*a* or 45*a* is substantially centered with respect to the blocking pulse upon the grids 44*b* or 45*b*. With this construction the signal pulses can be slightly different or misaligned in time of their arrival, and still achieve the mutual cancellation which gives the circuit its "not-and" characteristic.

The blocking oscillator 55 need not here be described in detail since, like the delay line, such circuits are described in standard literature, for example on page 205 of WAVEFORMS, by Chance, Hughes, MacNichol, Sayre, and Williams, Volume 19 in the Radiation Laboratory Series published by McGraw-Hill Book Company, New York.

It will be noted from FIG. 6 that the grid circuit of the oscillator 55 is biased to cut-off by a fixed negative voltage from battery 65 so that the tube 55 will remain nonconducting until a pulse is applied to it large enough to drive the grid well up towards zero voltage relative to the cathode.

The circuit of FIG. 6 is responsive only to minus pulses, a plus pulse having no effect since input tubes 67*m* and 67*c* are normally conducting at or near saturation, and plus pulses would not change the state of either tube. It will be understood that a pulse of one polarity at 19*m* of FIG. 1 can be made to cause a pulse of either the same or opposite polarity at 15*m* depending on the direction of the windings of the pulse transformer 23*m* and the number of polarity reversals in the amplifier 20*m*. If the circuit is constructed, however, so that a plus pulse at 19*m* causes a plus pulse at 15*m*, then this same plus pulse at 19*m* will also cause a minus pulse at 24*m*. A pulse of either polarity at 19*m* will cause simultaneous pulses at 15*m* and 24*m* and these latter two pulses will always be of opposite polarity with respect to each other. Thus the minus pulses at 15*m* and 15*c* may correspond to a point on the pattern or sample where the scanning beam goes from white to black or vice versa.

Within the scope of this invention, and for some purposes, the device may be operated with pulses of only one polarity and be unresponsive to pulses of the other polarity, since generally there will be the same number of plus pulses as negative. Greater reliability and accuracy will be obtained, however, if both plus and minus pulses are considered since in this manner a comparison will be made between the sample and the pattern where the scanning beam passes from a white area to a dark area and also where the beam passes from a dark area to a white area. For this reason I prefer to use two circuits such as FIG. 6, one at 22 and the other at 22*n*, connected to the pulse transformer 23*m* so that a pulse of either polarity at 19*m* will cause a negative pulse at either 22 or 22*n*.

As a graphic illustration of the operation of this form of device and its ability to distinguish between two characters which are very similar, there is shown in FIG. 7 a letter S and the numeral 5 to be compared with each other. The system of my invention makes separate scanning of these two characters. In this figure, however, I have superposed them in order to make a visual comparison possible. We may now consider two electron beams simultaneously but separately scanning these two figures, arranged to balance out the identities as we have described. Whenever the one beam encounters the edge of the 5 at the same time that the other beam encounters the corresponding edge of the S, the signals cancel out.

If now we place lines upon this figure to represent the path of the scanning beams, we will see that for every place where these scanning lines meet one of these figures but not the other, a pulse will result which will not be cancelled by a like pulse from the other and a pulse will be recorded on the pulse counter. In spite of the general similarity of the figures, it will be seen that there are a large number of places where one scanning beam would meet or leave an edge of its figure before the other scanning beam would meet or leave its figure. Each such instance would feed a pulse to the pulse counter.

In these embodiments which embody a magnetic drum, or equivalent memory device, the scanning beam must be kept in accurate synchronism with the rotation of the magnetic drum, and the electronic counter must be reset at the close of each comparison. There are thus provided upon the magnetic drum, two or three channels, as will be described later, two of which may be used to control the scan generators, and one of which is used to reset the counters and relays. In FIG. 8 there is shown an arrangement for comparing a specimen simultaneously with five different patterns. For example, we may use this arrangement to determine the identity of the sample with any of the five vowels, A, E, I, O, or U. In FIG. 9 there is shown a conventional simple scanning device for such a system, and in FIG. 10 the connections to the memory device.

As will be seen from FIG. 10, the memory device 74 has five recording heads **75*a*, 75*e*, 75*i*, 75*o*, and 75*u*, each recording on one channel of the memory device, and each connected to the video scanner circuit by a point A, E, I, O, U on a switch 76. By first scanning a vowel A with the switch connected to the head 75*a***, the proper sequence of pulses relating to the letter A will be imposed on the first channel. Similarly a proper pulse sequence for each of the other vowels may be imposed each on its proper channel.

The memory device has also five reading heads each controlled by one of the channels, here marked **77*a*, 77*e*, 77*i*, 77*o*, and 77*u*, each of which is used to make the comparison of the sample with its own letter. The memory device has also two heads 77*v* and 77*h* for controlling the scanning generators. There is also an eighth head 77*r*** to reset the counter elements and relays.

The scanning device of FIG. 9 is a conventional scanning element having the vertical control plates **78*v* operated by the vertical generator 79*v* controlled by the drum head 77*v*, and the horizontal control plates 78*h* operated by the horizontal generator 79*h* controlled by the drum head 77*h*. This is a relatively inexpensive type of television camera utilizing reflected light. The spot of light on the face of the cathode ray tube 68 is focused by lens 69 on the sample, which is shown in FIG. 9 as a symbol "E" on a background of contrasting energy-reflective property. Reflected light is detected by photo-tube 70**, the relative amount of reflected light being dependent on whether the spot of light focused on the sample falls on a light or dark portion of the sample.

The scanning signal is carried from the scanner 80 (see FIG. 8) thru amplifier 81 to a switch 82 having two positions, one of which **82*a* leads to amplifier 150 and from there to switch 76 for selectively connecting the scan signal to one of the recording heads at 75*a*, 75*e*, etc. The other position 82*b* of switch 82 connects that signal thru a differentiating circuit 83 to an amplifier 84 and thence to a pulse transformer 85** having its secondary grounded in the middle.

The terminals **72*a* to 72*u* are also connected thru amplifiers 86*a* to 86*u* to transformers 87*a* to 87*u* each of which also has its secondary grounded in the middle, as has been above described for transformer 85. These center-tapped pulse transformers provide a means for obtaining from each circuit two signals of opposite polarity, so that both the positive and negative pulses from the sample or pattern may be counted as was described in the circuit of FIG. 1**.

The upper output terminal of transformer 85 is connected to an input terminal 88a of each of five "or-not-and" circuits 91, 93, 95, 97, and 99. The lower output terminal is likewise connected to the **88*b* input of each of five other such circuits, 92, 94, 96, 98, and 100**. Thus either a plus or minus pulse from the scanning circuit will produce a minus pulse on each member of one or the other of these two sets of "or-not-and" circuit.

The upper terminal of the transformers 87, on the other hand, is connected, each to one only of these "or-not-and" circuits, that is the upper terminal of transformer **87*a* is connected to circuit 91, or 87*e* to circuit 93, of 87*i* to circuit 95 etc., while the lower terminal of each of these transformers is connected to one circuit only for each, the lower terminal of transformer 87*a* being connected to 92, that of 87*e* being connected to 94, etc. Thus, plus pulses from the memory will enter one circuit, as 91, as negative pulses, and negative pulses from the memory will enter the other, as 92, as negative pulses. Each of the circuits 91, 92, is of the type shown in FIG. 6 and the pulses from the upper terminal of transformers 87 correspond to the pulses 15*m* of FIG. 1 while the pulses from the lower terminal of transformers 87 correspond to the pulses 24*m* of FIG. 1. Since pulses of opposite polarity always occur simultaneously at the two ends of the secondary winding of transformer 87, there will be a plus pulse sent to 92 for each minus pulse sent to 91 and vice versa, but the circuits 91, 92, 93, etc. are unresponsive to the plus pulses, as was shown in FIG. 6**.

The two "or-not-and" or anti-coincidence circuits associated with each channel, such as circuits 91 and 92 of the "A" channel, jointly operate counters **101*a*, 101*e*, 101*i*, 101*o*, etc., and if the count of unmatched pulses is too great, a counter operates its relay 102** to reject the sample as different from its own pattern. Every counter will reject the specimen as having too many points of difference from its own pattern except the one which represents the same character, but that particular counter will indicate identity by counting no pulses or only a very few.

Let us now present the letter "E" to the machine for identification. The pulse data from the scanner, after being differentiated at 83 is fed to the pulse transformer 85 and thus fed to "or-not-and" circuits 91, 92, etc., it being noted that one side of the pulse transformer is connected to one "or-not-and" circuit and the other side is connected to the other "or-not-and" circuit of each channel. In synchronism with the scanning, each reading pick-up head feeds pulse data, corresponding to its own character, to the two or-not-and circuits of its channel. The pulse trains from the scanning and from the memory from channel E will be coincident in time spacings and will cancel each other at the or-not-and circuits, and the E counter will not reject. The counters of all the other channels however, will show many differences and the specimen will be rejected as differing from the symbol stored in every channel except the E channel. Thus it will be seen that by the process of elimination the specimen is identified as an E. If a G were presented it would be rejected by every channel, since the pulse data for a G is not stored in any channel.

An alternate form of this device makes use of a multiple scanning system. It does not require a memory device of the nature utilized with the preferred embodiment, and the measurement of the time coincidence of electrical impulses, or lack thereof, is not necessary. If, following the generally accepted definition used in television engineering, a "field" is considered to consist of a plurality of scanning "lines" which together cover the area of the picture or datum being scanned, then this alternate form of the device employs a plurality of fields with the direction of the lines in each field at an angle with respect to the lines of the previous field. During each field, as the symbol to be identified is scanned, the pulses from the scanning device are counted by an electronic counter. Each and every letter scanned will produce a definite number of pulses during each field. For a particular field there may be more than one letter having the same count, but there will be no two letters which have the same count for every one of a plurality of fields. If a relay unit containing a rejection device is provided for each letter or numeral to be identified, and after each and every field the rejection device operates to reject the letter or numeral as not being its own if the number of pulses counted during the preceding field do not correspond to the number for its letter or numeral, then, when the several fields in different directions have been completed, all of the rejection devices, except the one corresponding to the letter or numeral scanned, will have operated and rejected the letter or numeral scanned.

While either the scanning device or the datum being scanned might be rotated a discrete amount between fields, it is more convenient to permit a continuous rotation of the direction of the scan lines relative to the datum thus obtaining an increased operating speed without loss of accuracy. FIG. 15 illustrates the sequence of events which occur during the process of identification of a graphic datum.

An apparatus employing the method of multiple scanning is shown in FIG. 11. The use of three relay units 128 makes possible the identification of three letters or numerals such as the letters, A, B, and C for example. In general there must be one relay unit for each letter or numeral to be identified. The relays in the three relay units, 128*a*, 128*b* and 128*c*, operate to reject the datum presented for identification as not "A," not "B," or not "C" respectively if the number of pulses counted during any field is not the correct number for an A, B, or C respectively.

The horizontal and vertical scan generators, 140 and 141 perform the same functions generally as in the preferred form illustrated in FIG. 8. More specifically in this case, however, since the direction of the scan lines changes relative to the datum being scanned from one field to the next, the vertical scan generator 141 generates each scan line while the horizontal scan generator 140 causes the movement of the scan beam in a direction generally perpendicular to the direction of the scan lines.

The operation of the device shown in FIG. 11 can best be understood by examination of the various elements. The electronic counter 124, is shown in detail in FIG. 12. The other counters, 125 thru 127, are identical to counter 124. This is a binary counter since it can assume only two different stable states. There must, of course, be enough of these binary counters connected together to permit counting, in binary arithmetic, the largest number of pulses which will occur in any field, and the maximum count which a group of counter units connected in series is capable of counting is $(2^n-1)$ where $n$ is the number of binary counter units such as the one shown in FIG. 12. The number of pulses per field, in turn, is dependent on the number of lines per field and on the datum to be scanned.

The dual triode 170 in FIG. 12 together with its associated circuits is basically a binary counting unit. The plate lead 177 of the left hand half of dual triode 170 is connected thru resistance 270 to grid 170*b*, while the plate lead 178 is connected thru resistance 271 to grid 170*a*. By thus connecting each plate thru a suitable resistance to the grid of the other triode, a bistable device is created. If the left hand side of the dual triode is fully conducting it causes grid 170*b* to have a considerable negative voltage with respect to its cathode, so that the flow of current in the right hand half of the tube is substantially cut-off. As the current in the right hand half of the tube is cut off, the voltage at its plate lead 178 rises sufficiently to cause grid 170*a* to be positive with respect to its cathode, and the left hand half of the dual triode continues to be fully conducting. In the condition where the left hand side of the tube is fully conducting and the right hand side is substantially cut-off, the circuit is stable and this condition will continue indefinitely until upset by outside influences. On the other hand, if the grid 170*a* is momentarily made sufficiently negative with respect to its cathode to cut off the left hand side of the tube, the voltage at plate lead 177 will rise causing grid 170*b* to become less negative. The right hand side of the dual triode 170 starts to conduct and in so doing the voltage at its plate lead 178 decreases. This decrease in voltage is transmitted to grid 170*a* by resistor 271 and causes grid 170*a* to become more negative and further cuts off the left hand side of the dual triode 170. This process continues until the right hand half of the tube is fully conducting and the left hand side is substantially cut-off, this being the second stable state which the circuit can assume. The capacitors 272 and 273 speed up the transition from one stable state to the other by providing a relatively low impedance path for transient voltages from one plate to the opposite grid.

When a "flip-flop" or bistable device such as dual triode 170 is used as a binary counter, one of the stable states is designated the "0" condition and the other stable state is designated the "1" condition. The dual triode 170 will be considered to be in the "0" condition when the left hand side is fully conducting and the right hand side is substantially cut-off, and will be considered to be in the "1" condition when the left hand side is substantially cut-off and the right hand side is fully conducting. As the dual triode switches from the "1" to the "0" condition, the voltage on lead 176 becomes less negative or more positive and a plus pulse is sent to the next counter 125.

Plate power to operate the dual triode 170 is provided by batteries 181 and 274. The battery 181 is of such voltage that the voltage on the output lead 130 is essentially zero when the left hand side of the tube is cut-off and the voltage on output lead 131 is essentially zero when the right hand side of the tube is cut-off. The voltage at leads 130 and 131 is substantially negative when the left hand or right hand side respectively of the dual triode 170 is fully conducting. Thus the voltage on leads 130 and 131 can be used to indicate which of the two stable states the dual triode is in at any time.

The dual triode 171, with one plate lead connected to 177 and the other to 178, is used to cause the dual triode 170 to flop from one stable state to the other. In the absence of any pulses on lead 175, the battery 173 causes both halves of dual triode 171 to be fully cut-off. If, however, a positive pulse appears on lead 175, it causes both halves of dual triode 171 to become conducting, which in turn causes a drop in voltage at both 177 and 178. If the dual triode 170 was originally in the "0" condition the negative pulse at 177 and 178 would have no effect on the right hand side of the tube since this half of the tube is already cut-off. The negative pulses at 177 and 178, however, will cause the left hand side of the tube to be cut-off. As the left hand side cuts off, the voltage at lead 177 starts to rise and this rise in voltage is transmitted to grid **170*b* by resistor 270 and capacitor 272 and the right hand side of the tube starts to conduct. As the right hand side starts to conduct the voltage at lead 178 goes more negative, further cutting off the left hand side of the tube because of the resultant decreasing voltage at grid 170*a*. This action continues until the right hand side of the tube is fully conducting and the left hand side is cut-off and the dual triode 170 has assumed the "1" condition. When another plus pulse occurs at lead 175, the current in tube 170 will be transferred from the right hand half back to the left hand half. Thus for each plus pulse on 175, the dual triode 170 changes from one stable state to the other. Minus pulses on lead 175, on the other hand, cause no change, since dual triode 171 is statically biased beyond cut-off by battery 173**.

The triode 172 is used to reset the counter tube 170 by forcing tube 170 to assume the stable state corresponding to a "0." Tube 172 is statically biased beyond cut-off by battery 174. A minus pulse on lead 123 has no effect, but a plus pulse on lead 123 causes triode 172 to become conducting, which causes a transient negative voltage at lead 177. If the dual triode 170 is already in the "0" state and the right hand side is cut-off, the transient negative voltage at 177 and the resultant negative pulse at grid 170b have no effect. If, however, the dual triode 170 is in the "1" condition and the right hand side is fully conducting, the negative pulse at 177 when triode 172 becomes conducting causes grid **170*b* to cut-off, the left hand side of dual triode 170** becomes fully conducting, and the counter is in the "0" condition. Counters of this type are well known being described, for example, in the standard text, HIGH SPEED COMPUTING DEVICES by Engineering Research Associates, published by McGraw-Hill. Reference may be had particularly to section 3–5, page 17 thereof.

The relay units 128 are shown in detail in FIG. 13. The dual triode 150 operates in an identical fashion to the dual triode 170 of FIG. 12. In the dual triode 150, as with dual triode 170, each plate is connected thru a resistance and capacitance to the opposite grid thereby forming an electronic circuit which can assume, and maintain indefinitely, either of two stable states; either the left hand side of the tube is fully conducting and the right hand side is substantially cut-off or the left hand side is substantially cut-off and the right hand side is fully conducting. The battery 160 is of such voltage that the voltage on lead 159 is substantially negative when the left hand side of the dual triode 150 is fully conducting which corresponds to the "0" condition in the nomenclature established for the dual triode 170 of FIG. 12. When current in the left hand side of the dual triode 150 is essentially cut-off, the voltage on lead 159 is zero, and dual triode 150 is in the "1" condition.

The lead 159 is connected to the grid of triode 151, this triode being energized by battery 281 and containing relay 152 in its plate circuit. When current flows in tube 151 the relay !52 is energized, but when current is cut-off in tube 151 relay 152 is de-energized. The flow of current in tube 151 is determined by the voltage of its grid relative to its cathode, the latter being grounded. If the grid of tube 151 is substantially negative, the current in the tube is cut-off, but if the grid is at zero volts or slightly positive with respect to its cathode the tube is fully conducting. Since the grid of tube 151 is tied to the plate of the left hand side of dual triode 150 by lead 159, the triode 151 is cut-off and relay 152 is de-energized when the left hand side of dual triode 150 is fully conducting which corresponds to the "0" condition for dual triode 150. On the other hand, tube 151 is fully conducting and relay 152 is energized when the left hand side of the dual triode 150 is cut-off which corresponds to the "1" condition for dual triode 150.

The dual triode 153 is used to set and re-set the dual triode 150 and thereby energize and de-energize the relay 152. The triode 154 is a simple resistance-capacitance coupled voltage amplifier having a resistance in its plate circuit and being energized by battery 280. When a minus pulse occurs on lead **129*a* the pulse is amplified by tube !54 and sent to grid 153*a* as a plus pulse. The grid 153*a* is statically biased beyond cut-off by battery 157 so that this half of dual triode 153 is normally non-conducting. When a plus pulse is received on grid 153*a*, however, the left hand side of triode 153 becomes conducting, which causes a minus pulse to appear at the right hand plate lead 282 of dual triode 150 and also at grid 150*a*. If the left hand side of dual triode 150 was already cut-off this minus pulse has no effect, but if the left hand side of dual triode 150 has been conducting, the minus pulse on grid 150*a* causes it to be cut-off and the right hand side of dual triode 150 becomes fully conducting. With the left hand side of dual triode 150 cut-off, the triode 151 conducts and relay 152 operates. Additional plus pulses on grid 153*a* then have no further effect. Plus pulses on 129*a* cause minus pulses to occur at grid 153*a* but these have no effect since grid 153*a* is normally biased to cut-off by battery 157. It may then be said that a minus pulse on 129*a* causes the dual triode 150 to be "set," or placed in the "1" condition, which results in the relay 152** being "-set," or energized.

The relay 152, once having been "set," or energized, by a minus pulse on **129*a*, remains energized until the dual triode 150 is "reset" to the "0" condition in which the left hand side of dual triode 150 is fully conducting. The right hand side of dual triode 153 is used to reset the counter tube 150 and de-energize the relay 152**.

The grid 153*b* is normally biased to cut-off by battery 158. When a plus pulse appears on lead 145, the voltage on grid 153*b* goes in the positive direction and the right hand side of dual triode 153 becomes conducting, which in turn causes a negative pulse to occur on grid 150*b*. The minus pulse on grid 150*b* causes the right hand side of dual triode 150 to be cut-off while the left hand side of dual triode 150 becomes fully conducting. When this occurs the dual triode is in the "0" state and may be said to have been "reset," and the relay 152 is de-energized. If the dual triode 150 had been in the "0" state when the plus pulse occurred at grid 153*b*, the dual triode 150 would have remained in the "0" condition and the relay 152 would have remained de-energized. When the relay 152 is energized it operates a rejection device, indicating that the letter just scanned was not the one corresponding to the letter or symbol assigned to that particular relay unit.

The operation of the synchronizer unit 121 can best be understood by reference to FIG. 14, which is an electrical-mechanical schematic diagram of the synchronizer unit. In FIG. 14 solid lines are used to denote electrical connections and dotted lines to denote mechanical connections. The electric motor 256 drives shaft 192, which is coupled thru gear reduction 196 to shaft 193, which is in turn coupled to shaft 194 by gear reduction 197. The shaft 192 turns one revolution per scan line in the scanning device 120, the shaft 193 turns one revolution per scan field, and the shaft 194 turns one revolution for the group of scan fields which are used to identify each letter or symbol.

The pulses to synchronize the vertical scan generator are sent out on lead 143, the pulses to synchronize the horizontal scan generator are sent out on lead 142, pulses to reset the counters 124 thru 127 after each field are sent out on lead 123, and pulses to reset the relay units 128 after each series of fields are sent out on lead 145. The four pulse generating units 285 thru 288 all operate the same way so only pulse generating unit 285 will be described in detail. The wheel 250 in FIGS. 14 and 14*a* is driven by shaft 192*a* and turns at the same speed as shaft 192. On the rim of wheel 250 there is attached a small permanent magnet 254 (FIG. 14*a*). A coil 255 is placed so that the flux from permanent magnet 254 passes thru coil 255 once during each revolution of wheel 250. One end of coil 255 is grounded. The other end of coil 255 is attached to lead 143 so that a voltage of one polarity appears on lead 143 as flux from magnet 254 enters the coil, and a voltage of opposite polarity appears on lead 143 when flux from the magnet leaves coil 255. Thus as the permanent magnet rotates there is on lead 143 a short plus pulse and a short minus pulse, one after the other, as magnet 254 passes by the coil 255 (FIGS. 14 and 14*a*). As previously stated, these pulses on 143 are used to synchronize the vertical scan generator 141. The pulse generators 286 thru 288 operate in a manner identical to pulse generator 285, there being a plus and a minus pulse on leads 142 and 123 for each revolution of shaft 193, while a plus and a minus pulse appear on lead 145 for each revolution of shaft 194.

As previously mentioned, a continuous rotation of the direction of the scan lines with respect to the datum being scanned is provided. This rotation may be accomplished in any suitable manner, as by using a magnetic deflection yoke 257 placed about the neck of the scanner tube 258. The datum being scanned is held stationary, but the magnetic deflection yoke 257 is rotated, producing a continuous rotation of the scan lines relative to the datum being scanned. The magnetic deflection yoke 257 is mechanically connected to the shaft 194 and rotates one revolution for each revolution of shaft 194. Thus the direction of the scan lines rotate thru a full 360° during the process of identifying each letter or symbol. During each scan field, or for each revolution of shaft 193, the number of pulses resulting from scanning the datum to be identified are counted by counter units 124 thru 127. At the end of each field the outputs 130 thru 137 of the counter units are connected to leads 210 thru 217, respectively, by the counter output contacts 200 thru 207. The counter output contacts 200 thru 207 are driven by shaft 193*c*, rotate at the same speed as shaft 193, and make contact between leads 130 and 210, between 131 and 211, etc. for one short interval during each revolution, this contact being arranged to occur at the completion of each field.

The counter output multiple switching units 220 thru 227 are used to selectively connect the outputs of the counter units 124 thru 127 to the relay units 128 when the counter output contacts 200 thru 207 are closed. Multiple switching units 220*a* thru 227*a* are driven by shaft 194*a* and turn one revolution per revolution of shaft 194; multiple switching units 220*b* thru 227*b* are likewise driven by shaft 194*b* and multiple switching units 220*c* thru 227*c* are driven by shaft 194*c*. Thus each of the multiple switching units turns one revolution per revolution of the deflection yoke 257, which also corresponds to one revolution of the scan lines relative to the datum being scanned. There is provided one pair of multiple switching units, such as 220*a* and 221*a*, to connect a particular counter unit such as 124 with a particular relay unit, such as 128*a*. In each pair of counter output multiple switching units such as 220*a* and 221*a* there are a total of five contacts, so five scan fields are used to identify each letter or symbol. If the number of fields is increased the total number of contacts on each pair of multiple switching units such as 220*a* and 221*a* must be likewise increased. It will be noted that the contacts on any pair of multiple switching units, such as 220*a* and 221*a*, or 224*b* and 225*b*, are never made on both units of the pair at the same time. When contacts on one multiple switching unit in a pair are closed the contacts on the other switching unit in the pair are always open. This is done since after a particular field and for a particular letter or symbol scanned, each counter unit 124 thru 127 should be in a definite state, either the "0" or the "1" condition, if the symbol scanned was the one corresponding to the relay unit to which a particular set of multiple switching units are connected.

The outputs of the multiple switching units 220*a* thru 227*a* are connected together thru adding resistors 240*a* thru 247*a* and a voltage proportional to the sum of these outputs appears on lead 129*a* and is sent to relay unit 128*a*. Likewise the outputs of multiple switching units 220*b* thru 227*b* are connected together by adding resistors 240*b* thru 247*b* and sent by lead 129*b* to relay unit 128*b*. The outputs of multiple switching units 220*c* thru 227*c* are handled in a similar fashion and sent to relay unit 128*c*. The creation of the minus voltage which may appear on lead 129*a* may be better understood by consideration of a specific example. Assume that a field has just been completed scanning the letter "A," and assume that the counter output contacts 200 through 207 have just closed as shown in FIG. 14 and that the counter output multiple switching units 220*a* thru 227*a* are in the position shown in FIG. 14. If counter 124 is in the "1" condition there will be zero voltage on lead 210; if counter 125 is in the "0" condition there will be zero volts on lead 213; if counter 126 is in the "0" condition there will be zero volts on lead 215; and if counter 127 is in the "1" condition there will be zero volts on lead 216. This number in the counter units 124 thru 127 is 1001 in binary arithmetic, or 9 in decimal notation. In general the binary number represented by the zero's and/or one's in the counter units is determined by writing down, from left to right, the numbers in counters 127, 126, 125 and 124 in that order. The last counter 127 in the series of counter units corresponds to the highest order binary digit in the binary number. When counter output multiple switching units 220*a*, 223*a*, 225*a* and 226*a* are making contact as shown in FIG. 14, then the zero voltage on leads 210, 213, 215 and 216 as counter output contacts 200 thru 207 close will add up, thru resistors 240*a*, 243*a*, 245*a* and 246*a* to give zero volts on lead 129*a*. If, however, one or more counter units 124 thru 127 were not each in the condition assumed above, then there would be a minus pulse on one or more of the leads 210, 213, 215 and/or 216 when the counter output contacts 200 thru 207 closed with a resultant minus pulse on lead 129*a*. It will be seen that the magnitude of the minus pulse will be dependent upon which of the leads carries a minus pulse, with the leads corresponding to higher order binary digits providing greater minus pulses through their scaling resistors. Hence minus pulses on the least significant digit leads will cause minus pulses of lesser magnitude on conductors 129. A minus pulse of sufficient magnitude on 129*a* would cause relay unit 128*a* to operate. While the embodiment of FIGS. 1 and 8 serially applies pulses to its comparing means as scanning proceeds, it will be seen that the embodiment of FIGS. 11 – 14 derives electrical quantities in parallel digital form, and that the parallel quantities are applied simultaneously at the end of a scanning field to be compared with the parallel number built into the synchronizer. The stored number is subtracted from the number presented to the synchronizer, and upon exceeding a desired tolerance, the remainder signal operates to reject.

Let us now assume that the multiple switching units 220*a* thru 227*a* have been properly arranged so relay unit 128*a* will identify the letter "A," units 220*b* thru 227*b* and relay unit 128*b* will identify the letter "B;" and units 220*c* thru 227*c* and relay unit 128*c* will identify the letter "C." If the letter "A" is now presented for identification and scanned by the several fields it will be found that the voltage on lead 129*a* remains zero when the counter output contacts 200 thru 207 close at the end of each field because the counter units will in every field have counted the number of pulses corresponding to the letter "A." Thus no minus pulses will be sent to relay unit 128*a* and the relay 152 in relay unit 128*a* will not operate to reject the letter scanned and having failed to reject will thereby indicate that the letter scanned was an "A." As the counter output contacts 200 thru 207 close after each field, however, a minus voltage will appear once or more on leads 129*b* and 129*c*, causing the relays in relay units 128*b* and 128*c* to operate and reject the letter scanned as not "B" and not "C." The minus voltage appears once or more on 129*b* and 129*c* because the number of pulses counted in each and every field will not be the correct number for the letters "B" and "C" respectively. After the series of fields have been completed, the plus pulse on lead 145 from pulse generator 288 resets all the relay units 128 so they are ready to identify the next letter of symbol presented to the device. If, however, the letter "E" had been presented for identification, the relays in all of the relay units 128 would operate to indicate that the letter scanned was not "A," not "B," and not "C." Thus it will be seen that the alternative embodiment of the invention scans the unknown symbol in a plurality of different directions to derive electrical quantities in the form of pulse-counts, which are coded as digital (binary in the example) numbers on conductors 130–137. These quantities are compared in accordance with their number (rather than in accordance with their time-spacing as in the preferred embodiment) with stored number quantities represented by the circuit connections of the pattern apparatus shown in FIG. 14. If the coded number represented on the conductors 130–137 does not agree with the stored number built into a particular switching circuit of the pattern, that switching circuit operates to reject the unknown symbol as different than the symbol represented by the stored number associated with the switching circuit.

If it is necessary or desirable to have no mechanical connection between shaft 194 and the scanner tube 258 as shown in FIG. 14, an arrangement such as is shown in FIG. 14*b* can be used. In FIG. 14*b* the scanner tube 302 has electrostatic deflection plates which include vertical deflection plates 301*v* and horizontal deflection plates 301*h*. The outputs of the horizontal scan generator 140 and the vertical scan generator 141 are connected thru the magnetic resolver 303 to the horizontal and vertical deflection plates 301*h* and 301*v* respectively.

A magnetic resolver such as shown at 303 in FIG. 14*b* has two windings, R1–R3 and R2–R4, in its rotor, and these two windings are displaced ninety degrees with respect to each other. The resolver also has two windings, S1–S3, and S2–S4, in its stator and these two windings are also placed at 90° to each other. The rotor the resolver 303 is capable of turning thru 360° with respect to its stator. The voltage generated in winding S1–S3 is proportional to the sum of two voltages: the voltage across winding R1–R3 times the cosine of the angle between windings S1–S3 and R1–R3 plus the voltage across winding R2–R4 times the cosine of the angle between S1–S3 and R2–R4. Likewise the voltage generated in winding S2–S4 is proportional to the sum of two voltages: the voltage across winding R1–R3 times the cosine of the angle between S2–S4 and R1–R3 plus the voltage across winding R2–R4 times the cosine of the angle between windings S2–S4 and R2–R4. Another way to visualize what the resolver 303 does is to consider the voltages in the two windings R1–R3 and R2–R4 as vectors which are added vectorally in the rotor to produce a single resultant voltage or vector. The two windings S1–S3 and S2–S4 each have induced in them a voltage proportional to the component of the resultant vector in the directions of the stator windings. If the voltages in the two rotor windings remain constant while the rotor revolves with respect to the stator, the stator winding voltages will vary in a sinusoidal fashion as the rotor is turned, but the rotor positions for maximum voltage in winding S1–S3 will be ninety degrees displaced from the rotor positions for maximum voltage in windings S2–S4. If now the magnetic resolver 303 is connected between the horizontal scan generator 142 and vertical scan generator 143 and the horizontal and vertical deflection plates 301*h* and 301*v* respectively of the scanner tube 302 as shown in FIG. 14*b*, and further if the rotor of the resolver 303 is driven by shaft 194, then the direction of the scan fields in scanner tube 302 will rotate at the same rate as shaft 194. Thus the resolver 303 driven by shaft 194 will produce the same results as rotation of magnetic deflection yoke 257 by shaft 194 in FIG. 14. The rotation of a magnetic deflection yoke 257 as shown in FIG. 14 and the use of a magnetic resolver which is rotated by a shaft as in FIG. 14*b* are both well known techniques and both methods have been used, for example, in radar scopes of the PPI, or Plan-Position-Indicator, type.

Since certain changes may be made in the construction set forth and in carrying out the above method, and different embodiments of the invention may be provided without departing from the scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

I claim:

1. In a device of the character described, means for comparing two different electrical quantities each comprising a plurality of pulses in time sequence, said means comprising an electronic gate for each quantity, and a coincidence circuit, each of said electrical quantities being connected to a first input of its respective electronic gate, and each being connected to a respective input of the coincidence circuit, both of said gates being biased to pass pulses of at least one polarity from either input quantity, a counter energized by the output of said gates, the coincidence circuit being biased to produce an output when energized by simultaneous pulses of said polarity, the output of said coincidence circuit being connected to a second input of each of said gates so that an output from the coincidence circuit causes both of said gates to be blocked so that no pulses from either of said electrical quantities are sent to said counter.

2. A device according to claim 1 in which the connections from the coincidence circuit to said second inputs of said gates includes means to prolong the pulse to said second inputs of said gates.

3. A device according to claim 2 in which the input pulses to said first inputs of said gates are slightly delayed to assure that said pulses arrive at the said gates within the duration of the prolonged pulse from the coincidence circuit to the said second inputs of said gates.

4. Apparatus according to claim 1 including means responsive to said two different electrical quantities for providing third and fourth electrical quantities opposite in polarity to said two electrical quantities, a second coincidence circuit connected to receive said third and fourth electrical quantities, a third gate connected to receive said quantity and the output from said second coincidence gate and operative to pass pulses of said third quantity to said counter in the absence of an output from said second coincidence circuit, and a fourth gate connected to receive said fourth quantity and the output from said second coincidence gate and operative to pass pulses of said fourth quantity to said counter in the absence of an output from said second coincidence gate.

5. An anti-coincidence circuit for comparing two electrical quantities comprising a pair of double triode gates each having a grid connected to receive one of said quantities and biased to conducting condition and each having its plates in multiple and energized thru a resistance and having its cathodes in multiple; and a counter connected to the plates of both tubes, whereby a minus pulse from either quantity will actuate the counter, and a coincidence triode having its grids connected respectively to receive the two quantities and having its cathodes in multiple and its plates in multiple and energized thru a resistance, both grids being biased to conductive condition, and a circuit connecting the plates of said coincidence triode with the other grids of said first-mentioned triodes, whereby no signal will be sent to said counter if both halves of said coincidence triode are cut-off.

6. An anti-coincidence circuit for comparing two electrical quantities comprising a pair of double triode gates each having a grid connected thru a delaying circuit to receive one of said quantities and biased to conducting condition and each having its plates in multiple and energized thru a resistance and having its cathodes in multiple; and a counter connected to the plates of both tubes, whereby a minus pulse from either quantity will actuate the counter, and a coincidence triode having its grids connected respectively to receive the two quantities and the grids in multiple and the plates in multiple and energized thru a resistance, both grids being biased to conductive condition, and a circuit connecting the plates of said coincidence triode with the other grids of said first-mentioned triodes, whereby no signal will be sent to said counter if both halves of said coincidence triode are cut-off.

7. An anti-coincidence circuit for comparing two electrical quantities comprising a pair of double triode gates each having a grid connected thru a delaying circuit to receive one of said quantities and biased to conducting condition and each having its plates in multiple and energized thru a resistance and having its cathodes in multiple; and a counter connected to the plates of both tubes, whereby a minus pulse from either quantity will actuate the counter, and a coincidence triode having its grids connected respectively to receive the two quantities and the grids in multiple and the plates in multiple and energized thru a resistance, both grids being biased to conductive condition, and a circuit including a blocking oscillator and connecting the plates of said coincidence triode with the other grids of said first-mentioned tirodes, triodes, no signal will be sent to said counter if both halves of said coincidence triode are cut-off.

8. In a device of the character described, in combination, means for producing an electrical quantity having pulses in time sequence characteristic of a visible character, means for producing a comparable electrical quantity characteristic of a pattern, a coincidence circuit, means for connecting each quantity to said coincidence circuit, a pair of electronic gates, means for connecting one of said quantities thru a delaying circuit to one input of said gates, means for connecting the other of said quantities thru a delaying circuit to one input of the other of said gates, both of said gates being biased to a condition to permit passage of pulses of at least one polarity in said electrical quantities, and a pulse counter responsive to pulses which are passed by either of said gates, and means for connecting the output of the coincidence circuit to the other input of each of said gates and including means whereby an output from said coincidence circuit causes the gates to block pulses from both of said electrical quantities and to prevent said pulses being passed to said counter.

9. In a device of the character described, in combination, means for producing an electrical quantity having pulses in time sequence characteristic of a visible character, means for producing a comparable electrical quantity characteristic of a pattern, a coincidence circuit, means for connecting each quantity of said coincidence circuit, a pair of electronic gates, means for connecting one of said quantities thru a delaying circuit to one input of one of said gates, means for connecting the other of said quantities thru a delaying circuit to one input of the other of said gates, both of said gates being biased to a condition to permit passage of pulses of at least one polarity in said electrical quantities, a pulse counter responsive to pulses which are passed by either of said gates, and means for connecting the output of the coincidence circuit by means of a blocking oscillator to the other input of each of said gates and including means whereby an output from said coincidence circuit causes the gates to block pulses from both of said electrical quantities and to prevent said pulses being passed to said counter.

10. In a device of the character described, in combination, means for producing an electrical quantity having pulses in time sequence characteristic of a visible character, means for producing a comparable electrical quantity characteristic of a pattern, a coincidence circuit, means for connecting each quantity to said coincidence circuit, a pair of electronic gates, means for connecting one of said quantities thru a delaying circuit to one input of one of said gates, means for connecting the other of said quantities thru a delaying circuit to one input of the other of said gates, both of said gates being biased to a condition to permit passage of pulses of at least one polarity in said electrical quantities, and a pulse-counter responsive to pulses which are passed by either of said gates, and means for connecting the output of the coincidence circuit to the other input of each of said gates and including means to prolong the output from said coincidence circuit whereby an output from said coincidence circuit causes the gates to block pulses from both of said electrical quantities and to prevent said pulses being passed to said counter.

11. In a device of the character described, in combination, means for producing an electrical quantity having pulses in time sequence characteristic of a visible character, means for producing a comparable electrical quantity characteristic of a pattern, a coincidence circuit, means for connecting each quantity to said coincidence circuit including means to prolong the pulses in at least one of said quantities, a pair of electronic gates, means for connecting one of said quantities thru a delaying circuit to one input of one of said gates, means for connecting the other of said quantities thru a delaying circuit to one input of the other of said gates, both of said gates being biased to a condition to permit passage of pulses of at least one polarity in said electrical quantities, a pulse counter responsive to pulses which are passedby either of said gates, and means for connecting the output of the coincidence circuit to the other input of each of said gates including means to prolong the output from said coincidence circuit whereby an output from said coincidence circuit causes the gates to block pulses from both of said electrical quantities and prevent said pulses being passed to said counter.

12. Apparatus for identifying a first graphic item of indicia within a background area by comparing it with a multiplicity of representations of reference indicia wherein each of at least two of said reference indicia are characterized by having as a part of the item of indicia a portion without counterpart in the other one of said two reference indicia, comprising: means for sensing said item of indicia and background; said sensing means including an electrical device operative in accordance with a predetermined spatial sensing pattern for generating a first pattern of electrically represented digits uniquely commensurate with said first item of indicia, with a first digital value for a digit representing a transition location from said item of indicia to said background included in said sensing pattern, a second digital value for a digit representing a transition location from said background to said item of indicia included in said sensing pattern, and a third digital value for a digit representing a non-transitional location in said sensing pattern; means for generating a multiplicity of reference patterns of electrically represented digits each pattern of which is uniquely commensurate with a different reference indicia from that of the others of said multiplicity of patterns; circuit means for comparing said first pattern digit by digit with one of said reference patterns and for generating an output signal whenever a digit in said first pattern has a different digital value from its counterpart in the reference pattern being compared; and counting means responsive to said circuit comparing means for totaling all of said output signals.

13. In a character reading machine, means to scan a character to be recognized, photo-responsive means associated with said scanning means, image examining means including said scanning means to produce information which is a function of said character, a plurality of memory element means each storing information defining one of a set of characters to be recognized, said photo-responsive means being arranged to produce signals which are a function of the character information produced by the said scanning means, and means to compare said signals with said stored information to determine which one of all said memory elements contains the character information most closely matched to the information derived from said unknown character.

14. The combination according to claim 13 wherein said scanning means comprises means for scanning said character to be recognized with a plurality of separate scan lines each of which advance across said character in the same scanning direction.

15. The combination according to claim 13 wherein said means to compare said signals includes means for providing an indication of which one of all said memory elements contains the character information most closely matched to the information derived from said unknown character, and wherein said means to compare said signals includes means for preventing said indication if said information derived from scanning said unknown character differs from the information stored in said memory element means by more than a selected tolerance.

16. The combination according to claim 13 having means for processing said signals produced by said photo-responsive means to provide further signals, and means for applying said further signals to said comparing means to compare said character information produced by said scanning means simultaneously with the information stored in all of said memory element means.

17. In a character recognition machine, means to compare a single character of a limited group of characters being recognized with all of a plurality of memory elements, each of said memory elements defining one of all of the possible characters of the group to be recognized, means for producing a group of separate signals as a result of the individual comparisons, the magnitude of each of said signals being an indication of the degree of match in each comparison, and means responsive to said signals of the group to identify a unique circuit associated with the optimum signal indicating the closest match and indicative of said single character.

18. The combination according to claim 17 wherein each of said memory elements comprises a magnetic memory means operable to store a respective plurality of bi-valued signals.

19. The combination according to claim 17 including means for scanning said single character with a plurality of separate scan lines to provide video signals, means for processing said video signals to provide further signals, and means for applying said further signals simultaneously to all of said memory elements to provide said group of separate signals all simultaneously.

20. The combination according to claim 17 wherein the last-recited means is operable not to identify said unique circuit if all said separate signals of said group have magnitudes which differ from a selected reference magnitude by more than a preselected tolerance.

21. The invention according to claim 17, said first named means comprising scanning means for successively examining small discrete portions of said character.

22. Apparatus for classifying an unknown signal waveform with respect to a plurality of known signal waveforms, comprising means for deriving a plurality of recognition signals respectively characteristic of the difference between said unknown signal waveform and each of said known signal waveforms, and means for deriving an output signal characteristic of the known waveform associated with the recognition signal indicating the least difference.

23. Apparatus for classifying an unknown signal waveform with respect to a plurality of known signal waveforms, comprising means for deriving digital signals characteristic of a multiplicity of points on said unknown signal waveform, means for processing each of said digital signals with respect to an electrical representation of each of said known waveforms to derive a like plurality of recognition signals, and means for deriving an output signal characteristic of the known waveform associated with the recognition signal indicating least difference.

24. Apparatus for recognizing each of a plurality of different wave shapes, comprising: means responsive to each one of said wave shapes for delivering a plurality of first signals which vary as a function of respective amplitudes of portions of said waveshapes; means for producing a reference signal; a plurality of comparison means, each having first and second input terminals, each of said comparison means being adapted to compare an input signal received at the first input terminal thereof with an input signal received at the second input terminal thereof and to produce a respective output signal representing a binary digit as a result of said comparison; means for applying said reference signal to the second input terminals of all of said comparison means; and means for applying each of said first signals to the first input terminal of a respective one of said comparison means.

25. Apparatus according to claim 24 in which said means for producing said reference signal comprises means for scanning an unknown character of a set of known characters to provide said reference signal.

26. Apparatus according to claim 24 having means for scanning unidentified characters of a set of known characters to provide said plurality of different wave shapes, and in which each one of a group of first signals which vary as a function of respective amplitudes of portions of a given waveshape derived from scanning a single character vary as a function of the amplitudes of said portions of said given waveshape at successive points in time over the time period during which said single character was scanned.

27. Apparatus according to claim 24 in which said reference signal is not predetermined and varies in accordance with the identity of an unknown character of a set of known characters.

28. Apparatus according to claim 24 in which said means for producing said reference signal comprises means for scanning a character of a set of known characters to provide said reference signal, and in which said means for scanning is also operative to provide each of said waveshapes as successive unknown characters of said set are scanned.

29. Apparatus according to claim 24 having means for scanning successive unknown characters of a set of known characters to provide said waveshapes and means responsive to the set of said input signals provided by said comparison means at the completion of the scanning of an unknown character for identifying said unknown character.

30. Apparatus according to claim 24 in which each of said waveshapes comprises a pulse train derived by scanning an unknown character of a set of known characters.

31. Apparatus according to claim 24 in which the time of occurrence of each of said first signals varies in accordance with a function of the amplitude of one of said portions of one of said waveshapes.

32. Apparatus for recognizing each of a plurality of different waveshapes derived from scanning successive ones of a plurality of unknown characters of a set of known characters, comprising, in combination: means for scanning said unknown characters successively to provide said plurality of different waveshapes, each of said waveshapes having a plurality of successive portions which vary in amplitude; means for receiving each one of said waveshapes and providing a plurality of further signals associated with each waveshape, each of said further signals associated with a given waveshape varying in accordance with a function of the amplitude of one of said successive portions of said given waveshape; means for producing a reference signal; a plurality of comparison means, each having first and second input terminals, each of said comparison means being adapted to compare an input signal received at the first input terminal thereof with an input signal received at the second input terminal thereof and to produce a respective output signal representing a binary digit as a result of said comparison; means for applying said reference signal to the second input terminals of all of said comparison means; and means for applying each of said further signals to the first input terminal of a respective one of said comparison means.

33. Apparatus for recognizing each of a plurality of different wave shapes, comprising: means for processing successive portions of each one of said wave shapes to provide a plurality of further signals each commensurate with an amplitude characteristic of a respective one of said portions; means for producing a reference signal; a plurality of comparison means each operable to compare a respective one of said further signals with said reference signal to produce a respective output signal representing a binary digit as a result of said comparison; and means for applying each of said further signals to a respective one of said comparison means and for applying said reference signal to each of said comparison means.

34. A monitoring system including a source of reference line-scan video signals representing the light intensity of successive points of a standard, first means synchronously operated with the reference line-scan video signals for generating line-scan video signals representing an object to be monitored, means coupled to said source for phase reversing the reference line-scan video signals, means for combining the phase reversed reference line-scan video signals with the line-scan signals representing the object to provide a signal of constant amplitude upon the occurrence of similar characteristics for successive scanned points on the object and on the reference and to provide a signal of a different instantaneous magnitude when the light intensity from any point on the object differs from the light intensity from the corresponding point on the standard, said source including a storage medium for recording line-scan video signals, and means connecting said generating means to said storage medium to couple the signals generated by said generating means for recording by said storage medium for use at a later time to detect any deviation in the instantaneous magnitude of the generated line-scan signals from the instantaneous magnitude of the recorded line-scan signals.

35. In apparatus for identifying a character contained within a background area on a record medium, optical scanning means for scanning said character to provide a first electrical signal varying between first and second levels as character portions and background area portions are scanned; means for differentiating said first electrical signal to provide a second electrical signal comprising pulses representing transitions between said character portions and said background area portions; and means responsive to said pulses for identifying said character.

36. The combination according to claim 35 wherein said means responsive to said pulses includes magnetic memory means.

37. Apparatus for identifying an unknown character located in a background area of contrasting light remissivity, comprising, in combination: means for scanning said unknown character to provide a multiplicity of scan signals each of which has a first level when a portion of said unknown character is scanned and a second level when said background area is scanned; memory means for providing a multiplicity of reference signals for each one of a set of characters to be identified, each of the reference signals of the multiplicity of reference signals associated with a given character varying in accordance with whether a respective portion of a field containing said given character contains a character portion or background; a plurality of comparing means each associated with a respective character of said set for comparing scan signals having said first level with a first plurality of reference signals associated with a respective character and providing a first group of further signals as a result of such comparisons; a plurality of comparing means each associated with a respective character of said set for comparing scan signals having said second level with a second plurality of reference signals associated with a respective character and providing a second group of further signals as a result of such comparisons; and a plurality of means each associated with a respective character for combining said first group of further signals with said second group of further signals to provide an additional signal characteristic of a respective character; and means responsive to said additional signals for identifying said unknown character.

38. The method of identifying an unknown character situated within a background area as one of a set of known characters, comprising the steps of scanning said unknown character to provide a multiplicity of scan signals including a first group of scan signals which have a first level and which are produced by sensing portions of said unknown character, and a second group of scan signals which have a second level and which are produced by sensing portions of said background area; providing a multiplicity of respective reference signals for each one of said set of known characters including for each of said known characters a first group of reference signals representing portions of the known character and a second group of reference signals representing background area associated with the known character; comparing the first group of said scan signals with the first groups of reference signals to provide a first plurality of comparison signals for each character of said set; comparing the second group of said scan signals with the second groups of reference signals to provide a second plurality of comparison signals for each character of said set; combining the first plurality of comparison signals and second plurality of comparison signals of each character of said set to provide a plurality of further signals each characteristic of the match between said unknown character and a respective character of said set; and comparing said further signals to identify said unknown character.

39. The method of identifying a symbol contained within a background area comprising the steps of scanning a symbol to provide a plurality of signals each characteristic of the light reflectance of an elemental area portion of said symbol or of background area within which said symbol is contained; comparing each of said signals with groups of stored data representing the light reflectances of elemental area portions of a group of known symbols contained within a background area to detect differences between said signals and said stored data; separately accumulating the differences between said signals and each of said groups of stored data representing said known symbols; and eliminating known symbols as differing from the symbol scanned when the accumulated differences associated with said known symbols exceed pre-determined tolerance values.

40. The method according to claim 39 wherein said step of comparing each of said signals comprises the step of comparing each of said signals with an element of stored data and detecting a difference only if the signal being compared differs from said element of stored data by an amount exceeding a second tolerance value.

41. The method according to claim 39 wherein said step of scanning comprises scanning said symbol and background area with a plurality of successive scan lines which sweep individually and successively across said symbol and background area.

42. The method according to claim 39 wherein said step of scanning comprises scanning said symbol and background area with a plurality of successive scan lines which sweep individually and successively across said symbol and background area each at a predetermined scanning speed.

43. The method according to claim 39 wherein said step of comparing includes the step of extracting said stored data groups representing said known symbols from a magnetic storage device in time synchronization with said step of scanning.

44. The method according to claim 39 wherein said step of comparing said signals with groups of stored data comprises the step of detecting similarities between said signals and said stored data and separating said detected similarities from said detected differences.

45. In pulse control apparatus operative with input pulses supplied to first and second input circuits, the combination of a first pulse generator device for providing a first output pulse in response to an input pulse being supplied to said first input circuit, a second pulse generator device for providing a second output pulse in response to an input pulse being supplied to said second input circuit, a first pulse delay device operatively connected to said first pulse generator device for providing a first delayed output pulse for each of said first output pulses provided by said first pulse generator device, a second pulse delay device operatively connected to said second pulse generator device for providing a second delayed output pulse for each of said second output pulses provided by said second pulse generating device, and a pulse control device responsive to said first output pulse and said second output pulse for providing a control pulse when said first output pulse is substantially coincident relative to said second output pulse, with each of said first and second pulse delay devices being responsive to said control pulse for preventing the provision of their respective first and second delayed output pulses upon the occurrence of said control pulse.

46. In pulse control apparatus operative with input pulses supplied to first and second input circuits, the combination of a first pulse generator device operatively connected to one of said input circuits for providing a first output pulse for each of said input pulses supplied to said one input circuit, a second pulse generator device operatively connected to said first pulse generator device for providing a second output pulse for each of said first output pulses supplied by said first pulse generating device, and a pulse control device having a first input operatively connected to said first pulse generating device and a second input operatively connected to the other of said input circuits for providing a third output pulse when each of the latter first and second inputs are energized by substantially simultaneous pulses, with said second pulse generating device being operatively connected to said pulse control device and responsive to said third output pulse for blocking the provision of at least one of said second output pulses when said third output pulse is provided.

47. In pulse control apparatus operative with input pulses supplied to first and second input circuits, the combination of a first pulse generator device for providing a first output pulse for each of said input pulses supplied to said first input circuit, a second pulse generator device for providing second output pulse for each of said input pulses supplied to said second input circuit, a first pulse delay device for providing a first delayed output pulse for each of said first output pulses provided by said first pulse generator device, a second pulse delay device for providing a second delayed output pulse for each of said second output pulses provided by said second pulse generating device, and a pulse control device responsive to each of said first output pulses and each of said second output pulses for providing a control pulse when one of said first output pulses is substantially coincident relative to one of said second output pulses, with at least one of said first and second pulse delay devices being responsive to said control pulse for preventing the provision of its respective delayed output pulses upon the occurrence of said control pulse.

48. In pulse control apparatus operative with input pulses supplied to first and second input circuits, the combination of a first pulse generator device operatively connected to one of said input circuits for providing a first output pulse in response to at least one of said input pulses supplied to said one input circuit, a second pulse generator device operatively connected to said first pulse generator device for providing a second output pulse in response to at least one of said first output pulses supplied by said first pulse generating device, and a pulse control device having a first input operatively connected to said first pulse generating device and a second input operatively connected to the other of said input circuits for providing a third output pulse when each of the latter first and second inputs are energized by substantially simultaneous pulses, with said second pulse generating device being operatively connected to said pulse control device and responsive to said third output for blocking the provision of at least one of said second output pulses when said third output pulse is provided.

49. In apparatus for optically translating an alphanumeric character from a record medium, said character being stylized to have at least first and second spaced portions, each portion having character segments in predetermined position locations, optical scanning means for scanning said first and second portions of said character in a direction so as to traverse said segments, optical detecting means coupled to said optical scanning means for producing position modulated output signals in response to the sensing by said sensing means of the presence or absence of a segment in each position of said portions, means for differentiating said position modulated signals and forming therefrom discrete pulses, and means for identifying said character in response to said discrete pulses.

50. A character recognition system including the combination of scanning means for providing an electrical signal having amplitude characteristics representative of a character to be identified, means for generating a sequentially appearing reference signal synchronized with the waveform from said scanning means and having amplitude characteristics representative of the signal produced by scanning of a known character, comparison means coupled to said scanning means and said reference signal generating means for providing a difference signal representing a difference between the amplitude characteristics of said electrical signal and said reference signal, an accumulator coupled to said comparison means for providing a signal corresponding to an accumulated difference between said signals over the time interval of said signals, and means coupled to said accumulator for sensing the identity of said character scanned in accordance with the magnitude of the accumulated difference signal from said accumulator.

51. A system according to claim 50 wherein said accumulator is operative to accumulate both positive and negative differences between said signals.

52. A system according to claim 50 wherein said means coupled to said accumulator for sensing the identity of said character scanned is operative to identify the character scanned when the degree of difference between the amplitude characteristics of said electrical signal provided by said scanning means and the reference signal provided by the reference signal generating means falls below a predetermined level.

53. A system according to claim 50 wherein said comparison means provides a difference signal which represents substantial transitions.

54. A system according to claim 50 wherein said difference signal comprises a pulse occurring each time a given amplitude transition of said electrical signal from said scanning means is not substantially simultaneously accompanied by a like amplitude transition of said reference signal.

55. A system according to claim 50 wherein said difference signal comprises a pulse occurring each time a given amplitude transition of said reference signal is not substantially simultaneously accompanied by a like amplitude transition of said electrical signal from said scanning means.

56. A character recognition system including the combination of scanning means for providing an electrical signal having a waveform representative of a character to be identified over a time interval during which said character is scanned, means for generating a plurality of sequentially appearing reference signals during said time interval, each of said reference signals having amplitude characteristics representative of the waveform produced by scanning a respective one of a set of known characters said system is intended to recognize, a plurality of comparison means each responsive to said electrical signal and a respective one of said reference signals for providing a difference signal representing a difference between the amplitude characteristics of the waveform provided by the scanning means and the respective reference signal to which it is responsive, a plurality of accumulator means each responsive to the difference signal from a respective one of said comparison means for providing a respective signal corresponding to the accumulated difference between the waveforms applied to a respective one of said comparison means, and a plurality of means each responsive to a respective one of said accumulator means for providing an output signal indicative of said character.

57. Character recognition apparatus comprising, in combination: means for scanning a character to provide an electrical signal having a sequence of amplitude transitions representative of said character; means for simultaneously generating a reference signal having a sequence of amplitude transitions representative of a known character; comparison means responsive to said signals for providing difference signals each time one of said signals experiences a given transition and the other of said signals does not experience a like transition within a predetermined amount of time following said given transition; means for accumulating said difference signals; and means for indicating the identity of said character when the magnitude of the accumulated difference signals falls below a predetermined level.

58. Apparatus for distinguishing from a given surface an item of indicia thereon of contrasting energy-reflective property and for identifying said item of indicia comprising in combination, means for scanning said surface to provide a first train of bi-valued pulses having time spacings dependent upon the distribution of said indicia on said surface, means for providing a second train of bi-valued pulses having time spacings dependent upon the distribution of a known element of indicia on a reference surface, coupling means connecting said two trains of pulses to anti-coincidence comparing means providing an output pulse for each pulse in each of said trains which is not coincident in time with a pulse in the other of said trains, and means coupled to said anti-coincidence comparing means for counting said anti-coincidence indicative output pulses from said anti-coincidence means.

59. Apparatus for distinguishing unknown graphic data contained within a portion of a background area comprising in combination, means for scanning said background area to provide a video signal, means differentiating said video signal to provide a first train of pulses, magnetic memory means synchronized with said scanning means and operable to provide a second train of pulses having time spacings representative of a known element of graphic data, gating means coupled to both said first and second trains of pulses and providing an output pulse upon the occurrence of a pulse in one of said pulse trains which does not occur in the same time period as a pulse in the other of said pulse trains and providing inhibition of an output pulse upon simultaneous occurrence of pulses of the same polarity in both trains, means connected to said gating means for counting said output pulses, and means responsive to a predetermined number of output pulses for providing a signal to indicate that said unknown graphic data differs from said known element of graphic data by an amount exceeding a predetermined tolerance.

60. Apparatus for distinguishing graphic data contained within a background area comprising means for scanning said area to derive a first train of pulses representative of said area, said pulses having time widths and time spacings dependent upon the position of portions of said data in said area and having amplitudes dependent upon the differences in light transmitting character between said portions of said data and said background area, means differentiating said pulses of said first train to provide a first series of sharp triggering pulses, said triggering pulses having time spacings dependent upon the position of said portions of data in said background area and having amplitudes substantially independent of the amplitudes of the undifferentiated pulses, means for providing a second series of sharp triggering pulses representative of a known element of graphic data, the pulses of said second series having time spacings dependent upon the positions of portions of said known element within a reference area and having substantially uniform amplitudes, gating means coupled to said first and second series of pulses and providing an output pulse upon the occurrence of a sharp triggering pulse in one of said series which does not occur in the same time period as a sharp triggering pulse in the other of said series and providing inhibition of an output pulse upon coincident occurrence of triggering pulses of the same polarity in each series, and a counter connected to said gating means to receive said output pulse and operable to actuate switching means upon receipt of a predetermined number of output pulses.

61. Apparatus for distinguishing from a given surface indicia thereon of contrasting energy-reflective property comprising in combination, means for scanning said surface to provide a first train of pulses having time spacings dependent upon the position of said indicia on said surface, means for providing a second train of pulses having time spacings characteristic of a known element of indicia on a reference surface, anti-coincidence means substantially insensitive to differences in pulse amplitudes for detecting and providing an output pulse for each pulse in each of said trains which is not coincident in time with a pulse in the other of said trains, counting means coupled to said anti-coincidence means for counting pulses of each train which are not coincident in time with pulses of the other train.

62. Apparatus for distinguishing from a background surface a symbol thereon of contrasting energy-reflective property comprising in combination means for scanning said surface to provide a first signal varying in amplitude substantially between a first value when background area is scanned and a second value when symbol area is scanned, storage means for providing a second signal characteristic of a similar scanning of a known symbol, circuit means coupled to said first and second signals for comparing the times at, and senses in, which said signals change from a coincidence to a non-coincidence in amplitude and for generating an output pulse each time either of said first and second signals changes in amplitude while the other one of said signals fails to so change and for generating an output pulse each time said first and second signals simultaneously change in amplitude but in opposite senses, said circuit means including a coincidence detecting means for precluding the generation of an output pulse from said circuit means when said first and second signals are simultaneously of similar amplitude and sense or simultaneously change in amplitude in the same sense, and counter means for totalling all of said output pulses from said circuit means.

63. Apparatus according to claim 62 having a synchronizing means responsive to said storage means for controlling said scanning means.

64. Apparatus according to claim 62 having means for differentiating said firs signal to provide a first train of spiked pulses and in which said storage means comprises a magnetic memory for producing a second train of spiked pulses.

65. Apparatus for identifying an unknown symbol comprising in combination means for scanning said symbol to provide a first series of bi-valued signals, a first plurality of means for comparing said first series of signals simultaneously with each group of a plurality of groups of stored data, each of said groups of stored data comprising a series of bi-valued signals characteristic of an individual known symbol, a second plurality of means each of which is individual solely to one group of said plurality of groups of stored data for detecting differences as to the time of occurrence and value of said signals in said first series of signals as contrasted with each of said groups of stored data, and a third plurality of means each individually responsive to an individual means of said second plurality for indicating the total number of said detected differences between said first series of signals and each of said plurality of groups of stored data.

* * * * *

Disclaimer 3,713,100.—*Harold S. Hemstreet*, Binghamton, N.Y. METHOD AND APPARATUS FOR IDENTIFYING LETTERS, CHARACTERS, SYMBOLS, AND THE LIKE. Patent dated Jan. 23, 1973. Disclaimer filed Dec. 21, 1977, by the inventor.

Hereby enters this disclaimer to claim 13 of said patent.

[*Official Gazette March 21, 1978.*]

UNITED STATES PATENT AND TRADEMARK OFFICE
CERTIFICATE OF CORRECTION

PATENT NO. : B1 3,713,100

DATED : July 3, 1990

INVENTOR(S) : Harold S. Hemstreet

It is certified that error appears in the above-identified patent and that said Letters Patent is hereby corrected as shown below:

Column 2, line 4, delete "1-21, 24-34, 36-44, 50-52, 54-57 and 59-65" and insert --1-24, 24-34, 36-44, 50-57, and 59-65--

Signed and Sealed this

Fourth Day of December, 1990

Attest:

HARRY F. MANBECK, JR.

*Attesting Officer* *Commissioner of Patents and Trademarks*

REEXAMINATION CERTIFICATE (1314th)

United States Patent [19]

[11] B1 3,713,100

Hemstreet

[45] Certificate Issued Jul. 3, 1990

[54] METHOD AND APPARATUS FOR IDENTIFYING LETTERS, CHARACTERS, SYMBOLS, AND THE LIKE

[76] Inventor: Harold S. Hemstreet, 33 Bhasking Ridge Rd., Wilton, Conn. 06897

Reexamination Request:
No. 90/001,050, Jul. 2, 1986

Reexamination Certificate for:

| | |
|---|---|
| Patent No.: | **3,713,100** |
| Issued: | **Jan. 23, 1973** |
| Appl. No.: | **336,080** |
| Filed: | **Feb. 10, 1953** |

[51] Int. Cl.$^{5}$ .................................................. G06K 9/00

[52] U.S. Cl. .................................. 382/34; 340/825.34; 382/30; 382/18

[58] Field of Search ........................ 382/30, 34, 18, 62, 382/64, 65, 58, 10, 20; 340/825.34; 358/471, 474

[56] References Cited

U.S. PATENT DOCUMENTS

| | | | |
|---|---|---|---|
| 1,815,996 | 7/1931 | Weaver | 178/4 |
| 1,915,993 | 6/1933 | Handel | 235/61.11 |
| 2,026,329 | 12/1935 | Tauschek | 235/61.6 |
| 2,131,911 | 10/1938 | Ayres | 250/220 |
| 2,210,706 | 8/1940 | Carlisle | 178/13 |
| 2,228,782 | 1/1941 | Sharples | 179/100.3 |
| 2,261,542 | 11/1941 | Dickinson | 235/61.11 |
| 2,362,004 | 11/1944 | Heidinger | 235/61.6 |
| 2,399,720 | 5/1946 | Brand et al. | 178/33 |
| 2,458,030 | 1/1949 | Rea | 340/175 |
| 2,464,353 | 3/1949 | Smith et al. | 328/154 |
| 2,493,543 | 1/1950 | Merchant | 340/228 |
| 2,513,525 | 6/1950 | Shenk | 328/140 |
| 2,517,102 | 8/1950 | Flory | 179/1 |
| 2,518,694 | 8/1950 | Jannopoulo | 179/1 |
| 2,533,242 | 12/1950 | Gridley | 340/318 |
| 2,601,393 | 6/1952 | Hammond | 340/164 |
| 2,615,992 | 10/1952 | Flory et al. | 35/35 |
| 2,616,983 | 11/1952 | Zworykin et al. | 179/100.3 |
| 2,626,989 | 1/1953 | Brown | 178/6.7 |
| 2,628,346 | 2/1953 | Burkhart | 340/174.1 |
| 2,648,723 | 8/1953 | Goldsmith | 178/6.8 |
| 2,652,491 | 9/1953 | Maher et al. | 328/109 |
| 2,653,186 | 9/1953 | Hurford | 178/7.1 |
| 2,659,823 | 11/1953 | Vossberg | 356/160 |
| 2,663,758 | 12/1953 | Shepard | 178/17 |
| 2,679,636 | 5/1954 | Hillyer | 340/149 |
| 2,682,043 | 6/1954 | Fitch | 340/147 |
| 2,712,898 | 7/1955 | Knutsen | 235/61.7 |
| 2,731,621 | 1/1956 | Sontheimer | 209/111.7 |
| 2,738,499 | 3/1956 | Sprick | 340/347 |
| 2,741,312 | 4/1956 | Johnson | 234/56 |
| 2,838,602 | 6/1958 | Sprick | 178/15 |
| 2,894,247 | 7/1959 | Relis | 340/149 |
| 3,469,263 | 9/1969 | King | 340/146.3 |

FOREIGN PATENT DOCUMENTS 650536 2/1951 United Kingdom .

OTHER PUBLICATIONS

High-Speed Computing Devices text by the staff of Engineering Research Associates, Inc. 1950, pp. 37-38, 269-276.

IMR brochure entitled "The Analyzing Reader", 8/1951.

"Research on Reading Aids for the Blind", Journal of the Franklin Institute, vol. 247, No. 5, May 1949, pp. 483-496.

*High-Speed Computing Devices*, ed. Stifler, Jr., 1950, pp. 17, 37, 38, 269-280.

"The Analyzing Reader-An Automatic Reading Device", IMRC, pp. 1-5.

*Primary Examiner*—David K. Moore

[57] ABSTRACT

In a character recognition machine, means to compare a single character of a limited group of characters being recognized with all of a plurality of memory elements, each of said memory elements defining one of all of the possible characters of the group to be recognized, means for producing a group of separate signals as a result of the individual comparisons, the magnitude of each of said signals being an indication of the degree of match in each comparison, and means responsive to said signals of the group to identify a unique circuit associated with the optimum signal indicating the closest match and indicative of said single character.

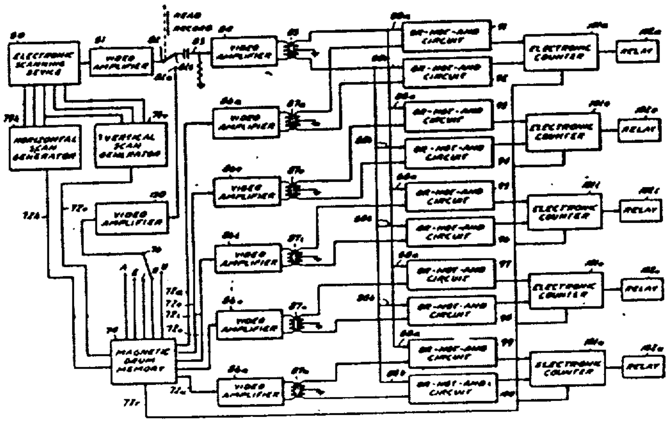

INVENTOR
HAROLD S. HEMSTREET
BY
ATTORNEY

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-21, 24-34, 36-44, 50-52, 54-57 and 59-65 is confirmed.

Claims 22, 23, 35, 45-49 and 58 are cancelled.

* * * * *

REEXAMINATION CERTIFICATE (1460th)

United States Patent [19]

[11] B2 3,713,100

Hemstreet

[45] Certificate Issued May 7, 1991

[54] METHOD AND APPARATUS FOR IDENTIFYING LETTERS, CHARACTERS, SYMBOLS, AND THE LIKE

[75] Inventor: Harold S. Hemstreet, 33 Bhasking Ridge Rd., Wilton, Conn. 06897

[73] Assignee: Harold S. Hemstreet, Wilton, Conn.

Reexamination Request:
No. 90/002,099, Jul. 31, 1990

Reexamination Certificate for:
Patent No.: 3,713,100
Issued: Jan. 23, 1973
Appl. No.: 336,080
Filed: Feb. 10, 1953

Reexamination Certificate B1 3,713,100 issued Jul. 3, 1990.

[51] Int. Cl.[5] .......... G06K 9/68
[52] U.S. Cl. .......... 382/34; 382/30; 382/18; 340/825.34
[58] Field of Search .......... 382/18, 30, 34; 340/825.34

[56] References Cited

U.S. PATENT DOCUMENTS

| | | | |
|---|---|---|---|
| 1,815,996 | 7/1931 | Weaver | 178/4 |
| 1,915,993 | 6/1933 | Handel | 235/61.11 |
| 2,026,329 | 12/1935 | Tauschek | 235/61.6 |
| 2,131,911 | 10/1938 | Ayres | 250/220 |
| 2,210,706 | 8/1940 | Carlisle | 178/13 |
| 2,228,782 | 1/1941 | Sharples | 179/100.3 |
| 2,261,542 | 11/1941 | Dickinson | 235/61.11 |
| 2,362,004 | 11/1944 | Heidinger | 235/61.6 |
| 2,399,720 | 5/1946 | Brand et al. | 178/33 |
| 2,458,030 | 1/1949 | Rea | 340/175 |
| 2,464,353 | 3/1949 | Smith et al. | 328/154 |
| 2,493,543 | 1/1950 | Merchant | 340/228 |
| 2,513,525 | 6/1950 | Shenk | 328/140 |
| 2,517,102 | 8/1950 | Flory | 179/1 |
| 2,518,694 | 8/1950 | Jannopoulo | 250/208 |
| 2,533,242 | 12/1950 | Gridley | 340/318 |
| 2,601,393 | 6/1952 | Hammond | 340/164 |
| 2,615,992 | 10/1952 | Flory et al. | 179/100.3 |
| 2,616,983 | 11/1952 | Zworykin et al. | 179/100.3 |
| 2,626,989 | 1/1953 | Brown | 178/6.7 |
| 2,628,346 | 2/1953 | Burkhart | 340/174 |
| 2,636,983 | 4/1953 | Poole | 250/27 |
| 2,648,723 | 8/1953 | Goldsmith | 178/6.8 |
| 2,652,491 | 9/1953 | Maher et al. | 328/109 |
| 2,653,186 | 7/1953 | Hurford | 178/7.1 |
| 2,659,823 | 11/1953 | Vossberg | 356/160 |
| 2,663,758 | 12/1953 | Shepard | 178/17 |
| 2,679,636 | 5/1954 | Hillyer | 340/149 |
| 2,682,043 | 6/1954 | Fitch | 340/147 |
| 2,712,898 | 7/1955 | Knutsen | 235/61.7 |
| 2,731,621 | 1/1956 | Sontheimer | 209/111.7 |
| 2,738,499 | 3/1956 | Sprick | 340/347 |
| 2,741,312 | 4/1956 | Johnson | 234/56 |
| 2,838,602 | 6/1958 | Sprick | 178/15 |
| 2,894,247 | 7/1958 | Relis | 340/149 |
| 3,469,263 | 9/1969 | King | 340/146.3 |

FOREIGN PATENT DOCUMENTS 650536 2/1951 United Kingdom .

OTHER PUBLICATIONS

Engineering Research Associates, Inc., "High-Speed Computing Devices," McGraw-Hill, 1950, pp. 265-275.

Zworykin-Flory-Pike article, "Letter Reading Machine," *Electronics*, Jun. 1949, pp. 80-86.

*Primary Examiner*—David K. Moore

EXEMPLARY CLAIM

17. In a character recognition machine, means to compare a single character of a limited group of characters being recognized with all of a plurality of memory elements, each of said memory elements defining one of all of the possible characters of the group to be recognized, means for producing a group of separate signals as a result of the individual comparisons, the magnitude of each of said signals being an indication of the degree of match in each comparison, and means responsive to said signals of the group to identify a unique circuit associated with the optimum signal indicating the closest match and indicative of said single character.

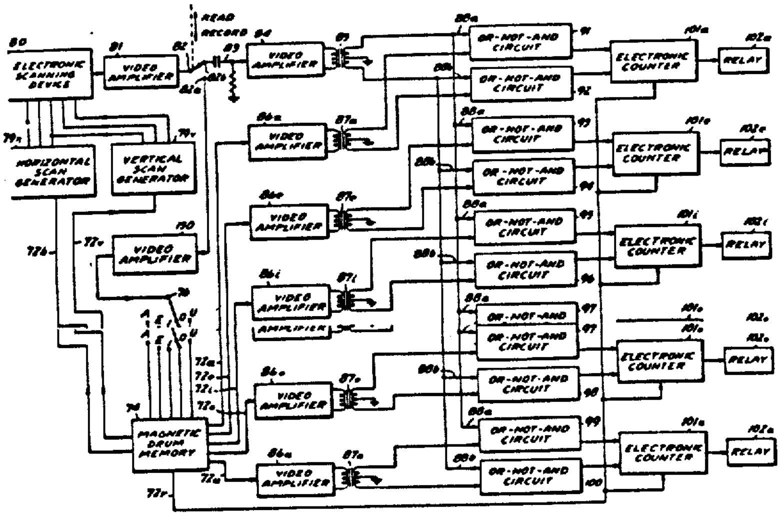

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–12, 14–21, 24–34, 37–44, 50–57 and 59–65 is confirmed.

Claims 22, 23, 35, 45–49 and 58 were previously cancelled.

Claim 13 was previously disclaimed.

Claim 36 is cancelled.

* * * * *